(12) United States Patent
Kobayashi

(10) Patent No.: US 8,693,096 B2
(45) Date of Patent: Apr. 8, 2014

(54) DIFFRACTIVE OPTICAL ELEMENT, OPTICAL SYSTEM INCLUDING THE SAME, AND IMAGE PICKUP APPARATUS

(75) Inventor: Mikio Kobayashi, Utsunomiya (JP)

(73) Assignee: Canon Kabushiki Kaisha (JP)

(*) Notice: Subject to any disclaimer, the term of this patent is extended or adjusted under 35 U.S.C. 154(b) by 468 days.

(21) Appl. No.: 12/948,983

(22) Filed: Nov. 18, 2010

(65) Prior Publication Data

US 2011/0122305 A1     May 26, 2011

(30) Foreign Application Priority Data

Nov. 20, 2009 (JP) ................................. 2009-264956

(51) Int. Cl.
*G02B 5/18* (2006.01)
*G02B 27/42* (2006.01)

(52) U.S. Cl.
CPC .......... *G02B 5/1814* (2013.01); *G02B 27/4211* (2013.01)
USPC ........................................................ 359/576

(58) Field of Classification Search
USPC ............................................... 359/558–576
See application file for complete search history.

(56) References Cited

U.S. PATENT DOCUMENTS

| | | | |
|---|---|---|---|
| 5,801,889 A | 9/1998 | Meyers et al. | |
| 7,236,302 B2 * | 6/2007 | Nakai et al. | 359/576 |
| 7,271,956 B2 * | 9/2007 | Ishii | 359/576 |
| 7,612,940 B2 | 11/2009 | Suzuki | |
| 2011/0304917 A1 * | 12/2011 | Ushigome | 359/576 |

FOREIGN PATENT DOCUMENTS

JP     2005-107298 A     4/2005

\* cited by examiner

*Primary Examiner* — Derek S Chapel
*Assistant Examiner* — Jeffrey Madonna
(74) *Attorney, Agent, or Firm* — Rossi, Kimms & McDowell LLP

(57) ABSTRACT

A diffractive optical element includes multiple diffraction gratings laminated and made of at least three material types, wherein the multiple diffraction gratings include: a first combination part including two diffraction gratings of materials different from each other in which grating side surfaces of grating parts contact with each other or are disposed close to each other in a grating pitch direction; and a second combination part including two diffraction gratings of materials different from each other in which at least one material is different from the materials of the first combination part; and when N1Aw and N1Bw denote refractive indices of the first combination part at a wavelength (w), ν1A and ν1B denote Abbe numbers, N2Ad and N2Bd denote refractive indices of the second combination part on a d-line, ν2A and ν2B denote Abbe numbers, the wavelength (w) is 370<w<730 (nm). The followings are satisfied:

$N1Aw - N1Bw = 0;$ $16 < (\nu 1A - \nu 1B) < 75;$ $0.03 < |N2Ad - N2Bd| < 0.5;$ and $16 < (\nu 2A - \nu 2B) < 75.$

19 Claims, 24 Drawing Sheets

DIFFRACTIVE OPTICAL ELEMENT, OPTICAL SYSTEM INCLUDING THE SAME, AND IMAGE PICKUP APPARATUS

BACKGROUND OF THE INVENTION

1. Field of the Invention

The present invention relates to a diffractive optical element and an optical system including the same, which is used as an optical system of optical equipment such as a video camera, a digital camera, and a television camera.

2. Description of the Related Art

As a method of reducing chromatic aberration of an optical system (lens system), there is known a method of combining different glass materials. Other than that, there is known a method of disposing a diffractive optical element having a diffraction action in a part of the optical system. It is known that the diffractive optical element is provided with an effect of chromatic aberration correction as well as an effect of an aspheric lens by changing a period of its periodical structure appropriately. Here, one light beam is still one light beam after being refracted, while one light beam is split into light beams of individual orders after being diffracted. Therefore, it is necessary to determine a grating structure so that light beams in a working wavelength range are concentrated in one specific order (hereinafter also referred to as a design order) when a diffractive optical element is used as the lens system.

Therefore, among diffractive optical elements that are used as a general diffraction lens, a diffractive optical element having a blaze structure can diffract light having a specific wavelength with high efficiency at a specific diffraction order. As a diffractive optical element having the blaze structure, there is known a diffractive optical element which diffracts light in a wide wavelength range with high efficiency (see Japanese Patent Application Laid-Open No. 2005-107298).

On the other hand, a light beam entering a grating side surface of a grating part of a diffraction grating behaves as being reflected or refracted by the grating side surface unlike the case of a grating surface, resulting in undesirable light. There is known a diffractive optical element in which a curvature of an envelopment surface of grating grooves and an angle of the grating side surface are optimized so that an incident light beam is hardly incident on the grating side surface in order to reduce undesirable light on the grating side surface (see U.S. Pat. No. 5,801,889).

The structure of changing an inclination of the grating side surface so as to reduce light having entered the grating side surface reaching an image plane (evaluation plane) in order that the undesirable light generated by the grating side surface is reduced does not always has a sufficient effect of reduction. It is preferred to set a grating thickness of the grating part of the diffraction grating to be small because when light that does not contribute to imaging enters a wall surface (grating side surface), a ratio of generation of undesirable light is small. Further, also concerning light that contributes to imaging, diffraction efficiency due to a variation of the light incident angle deteriorates less, which is desirable. It is known that in order to obtain high diffraction efficiency in a wide wavelength range in the diffractive optical element including diffraction gratings made of two different types of materials that are disposed in intimate contact to each other, a combination of a material having a high refractive index and low dispersion and a material having a low refractive index and high dispersion is necessary. In order to reduce the grating thickness of the grating part in the diffractive optical element including diffraction gratings made of two different types of materials that are disposed in intimate contact to each other, it is necessary to set a refractive index difference and a dispersion difference between the materials to be large. Therefore, it is necessary to prepare a material having a higher refractive index and lower dispersion, or a material having a lower refractive index and higher dispersion.

However, a relationship between the refractive index and the dispersion (wavelength dispersion of the refractive index) of an actually existing optical material generally shows a tendency that as the refractive index increases, the dispersion also increases. Therefore, it is very difficult to find a combination of multiple optical materials having a sufficient effect among currently used materials. There is known a diffractive optical element in which combinations of materials are increased so as to obtain relatively high diffraction efficiency in a wide wavelength range. However, in the structure, the entire grating thickness increases (the grating becomes thick). Therefore, undesirable light is generated when the light that does not contribute to imaging enters the wall surface (grating side surface), and it becomes very difficult to reduce the generated undesirable light.

SUMMARY OF THE INVENTION

A diffractive optical element according to the present invention includes multiple diffraction gratings that are laminated and are made of at least three types of materials, in which: the multiple diffraction gratings include: a first combination part including two diffraction gratings made of materials (M1A and M1B) different from each other in which grating side surfaces of grating parts contact with each other or are disposed close to each other in a grating pitch direction; and a second combination part including two diffraction gratings made of materials (M2A and M2B) different from each other in which at least one material is different from the materials of the two diffraction gratings of the first combination part; and when N1Aw and N1Bw respectively denote refractive indices of the materials (M1A and M1B) forming the first combination part at a wavelength (w) (nm), v1A and v1B respectively denote Abbe numbers of the materials (M1A and M1B) (v1A>v1B), N2Ad and N2Bd respectively denote refractive indices of the materials (M2A and M2B) forming the second combination part on a d-line, v2A and v2B respectively denote Abbe numbers of the materials (M2A and M2B) (v2A>v2B), and the wavelength (w) is in a range of 370 (nm)<w<730 (nm), the following equation and conditional expressions are satisfied:

$$N1Aw - N1Bw = 0;$$

$$16 < (v1A - v1B) < 75;$$

$$0.03 < |N2Ad - N2Bd| < 0.5; \text{ and}$$

$$16 < (v2A - v2B) < 75.$$

Further features of the present invention will become apparent from the following description of exemplary embodiments with reference to the attached drawings.

DESCRIPTION OF THE EMBODIMENTS

A diffractive optical element of the present invention includes three or more layers of diffraction gratings made of at least three types of materials, which are laminated directly, or via substrates, or via air layers. The multiple diffraction gratings include a first combination part including arbitrary two diffraction gratings and a second combination part including two diffraction gratings, at least one of which is different from the two diffraction gratings of the first combination part. The first combination part includes two diffraction gratings which are made of different materials M1A and M1B, and has grating side surfaces of the grating parts contacting each other or disposed close to each other in a grating pitch direction. The second combination part is made of different materials M2A and M2B, at least one of which is different from the materials of the two diffraction gratings of the first combination part.

Figure 3:
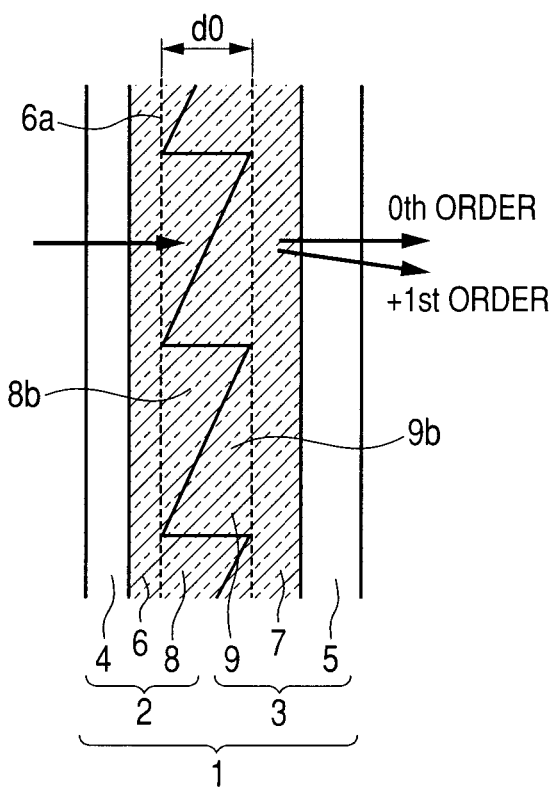
FIG. 3 is a partial cross sectional view of a diffractive optical element according to a comparison example.

First, a relationship between selection of materials forming the diffractive optical element of this embodiment and diffraction efficiency is described. With reference to FIG. 3 illustrating a reference example, in a diffractive optical element 1 including diffraction gratings 8 and 9 made of two different types of materials that are disposed in intimate contact to each other, a condition that diffraction efficiency of diffraction light of order m becomes maximum at a wavelength λ is described. The diffractive optical element 1 illustrated in FIG. 3 has a structure in which a first element part 2 and a second element part 3 are superposed so that the first diffraction grating 8 and the second diffraction grating 9 formed on the corresponding element parts are in intimate contact to each other. In addition, as illustrated in FIG. 3, the first element part 2 includes a first transparent substrate 4, a grating base part 6, and the first diffraction grating 8 that is made of a first material and is integrally formed with the grating base part 6.

On the other hand, similarly to the first element part 2, the second element part 3 includes a second transparent substrate 5, a grating base part 7 formed on the second transparent substrate 5, and the second diffraction grating 9 that is made of a second material and is integrally formed with the grating base part 7. The first element part 2 and the second element part 3 act as the one diffractive optical element 1 as a whole. The first diffraction grating 8 and the second diffraction grating 9 have a grating shape having concentric circles, and a grating pitch in the radial direction changes so as to have a lens action. In the diffractive optical element 1 illustrated in FIG. 3, a wavelength range of light entering the diffractive optical element 1, namely a working wavelength range is a visible range (having a wavelength from 370 to 730 nm). The materials of the first diffraction grating 8 and the second diffraction grating 9, and a grating thickness d0 of grating parts 8b and 9b are selected so that diffraction efficiency of first order diffraction light becomes high in the entire visible range.

If the light beam enters a base surface 6a of the diffraction grating (surface 6a illustrated in FIG. 3 by a dot line) at right angles, an optical difference in optical path length between peak and valley of the diffraction grating (i.e., a difference in optical path length between light beams passing through the peak and the valley) becomes multiple of an integer of the wavelength of the light beam. This is expressed by the equation as follows:

$$(n2-n1)d0 = m \times \lambda \quad (\text{x1})$$

where n1 and n2 respectively denote refractive indices of materials of the first diffraction grating 8 and the second diffraction grating 9 for light having a wavelength $\lambda_0$ (n1<n2). In addition, d0 (>0) denotes a grating thickness, and m denotes a diffraction order.

In FIG. 3, the diffraction order of light being diffracted downward from the 0th order diffraction light is regarded as a positive diffraction order, while the diffraction order of light being diffracted upward from the 0th order diffraction light is regarded as a negative diffraction order. Here, a sign of the grating thickness d0 in the above-mentioned equation (x1) is positive in the case of the diffraction grating having a grating shape in which the grating thickness increases in the direction from top to bottom of the diagram (second diffraction grating 9). In addition, diffraction efficiency $\eta(\lambda)$ at an arbitrary wavelength $\lambda$ is expressed by the following equation:

$$\eta(\lambda) = \sin c^2 [\pi \{M - (n2(\lambda) - n1(\lambda))d/\lambda\}] \quad (\text{x2})$$

In the above-mentioned equation (x2), M denotes an order of the diffraction light to be evaluated, $n1(\lambda)$ and $n2(\lambda)$ respectively denote refractive indices of materials of the first diffraction grating 8 and the second diffraction grating 9 for light having the wavelength $\lambda$. In addition, sin $c^2(x)$ denotes a function expressed by $\{\sin(x)/x\}^2$.

The above-mentioned equation (x1) includes a term of the wavelength. Therefore, in order to obtain high diffraction efficiency in the wide wavelength range, it is necessary to use such a material that allows the refractive index at each wavelength for using the diffractive optical element to satisfy the equation (x1) as much as possible. For instance, in order to obtain high diffraction efficiency in a wide wavelength range of the visible range, it is necessary to satisfy the equation (x1) at wavelengths not only of the d-line but also of the F-line and the C-line. Specifically, when d0 denotes a grating thickness that enables obtaining high diffraction efficiency at a wavelength of the d-line, it is necessary to use a combination of materials that satisfies the following conditions as much as possible:

$$(n2d - n1d)d0 = m \times \lambda d \quad (\text{x3a})$$

$$(n2F - n1F)d0 = m \times \lambda F \quad (\text{x3b})$$

$$(n2C - n1C)d0 = m \times \lambda C \quad (\text{x3c})$$

where n1d, n1F, and n1C denote refractive indices of the material of the first diffraction grating 8 at wavelengths of the d-line, the F-line, and the C-line, respectively. In addition, n2d, n2F, and n2C denote refractive indices of the material of the second diffraction grating 9 at wavelengths of the d-line, the F-line, and the C-line, respectively. A design diffraction order m is set to one. Subtracting each term of the equation (x3c) from each term of the equation (x3b) gives the following equation.

$$(n2F - n2C) - (n1F - n1C) = (\lambda F - \lambda C)/d0 \quad (\text{x3d})$$

Here, solving for d0 from the equation (x3a) and substituting the obtained d0 into the grating thickness d0 in the equation (x3d), the following equation is obtained.

$$(n2F - n2C) - (n1F - n1C) = (\lambda F - \lambda C)/\lambda d \times (n2d - n1d) \quad (\text{x3e})$$

From the formula (x3e), the following equation is obtained.

$$(n2d - n1d)/\{(n2F - n2C) - (n1F - n1C)\} = \lambda d/(\lambda F - \lambda C) = -3.45 \quad (\text{x3f})$$

Rewriting as:

$$\Delta n = (n2d - n1d) \quad (\text{x3g})$$

$$\Delta nFC = \{(n2F - n2C) - (n1F - n1C)\} \quad (\text{x3h})$$

Then, the equation (x3f) can be written as below:

$$\Delta n/\Delta nFC = -3.45 \quad (\text{x3i})$$

Therefore, it is understood that the refractive index difference and the dispersion difference between the two materials have constant values. Further, because the value of the equation (x3i) is negative, it is also understood that the material of the diffraction grating is a combination of a material having a high refractive index with low dispersion and a material having a low refractive index with high dispersion. It is understood from the equation (x3a) that it is necessary to set the refractive index difference to be large for reducing the grating thickness d0 and obtaining high diffraction efficiency in a wide wavelength range. At the same time, it is understood from the equation (x3i) that it is necessary to set the dispersion difference to be large.

Here, the case where the grating thicknesses of the diffraction gratings 8 and 9 are set to a grating thickness d1 that is smaller than the grating thickness d0 is considered. In this case, the dispersion difference between the two materials should also be set to a large value. However, it is supposed that the dispersion difference is set to a small value. As described above, if a combination of materials having a small dispersion difference is used, selection of the materials is facilitated. In particular, if the grating thickness of the diffractive optical element 1 is decreased to approximately a few microns, the dispersion difference between the two materials becomes very large, and hence it may be very difficult to use current materials. Therefore, setting the dispersion difference to a small value is preferred because the degree of freedom in selecting materials is largely increased.

Here, a case of the diffractive optical element 1 illustrated in FIG. 3 is considered in which the second diffraction grating 9 is formed of a material having refractive indices N2 (N2d, N2F, N2C) larger than n2 (n2d, n2F, n2C) with the dispersion thereof unchanged, and the grating thickness is decreased. If the diffraction grating is formed so that the grating thickness of the diffraction grating becomes the grating thickness d1 satisfying the equation (x3a) at a wavelength of the d-line, the equations of the difference in optical path length at each wavelength become as follows:

$$(N2d-n1d)d1 = m \times \lambda d \quad \text{(x3aa)}$$

$$(N2F-n1F)d1 = m \times \lambda F + \alpha F \quad \text{(x3bb)}$$

$$(N2C-n1C)d1 = m \times \lambda C - \alpha C \quad \text{(x3cc)}$$

Therefore, the diffraction efficiency may deteriorate at wavelengths of the F-line and the C-line. Here, $\alpha F$ and $\alpha C$ denote deviation of the difference in optical path length for the F-line and the C-line, respectively. Therefore, it is supposed that a diffraction grating using a combination of the second material is further disposed so as to correct the deviation of the difference in optical path length for the F-line and the C-line.

Figure 4A:
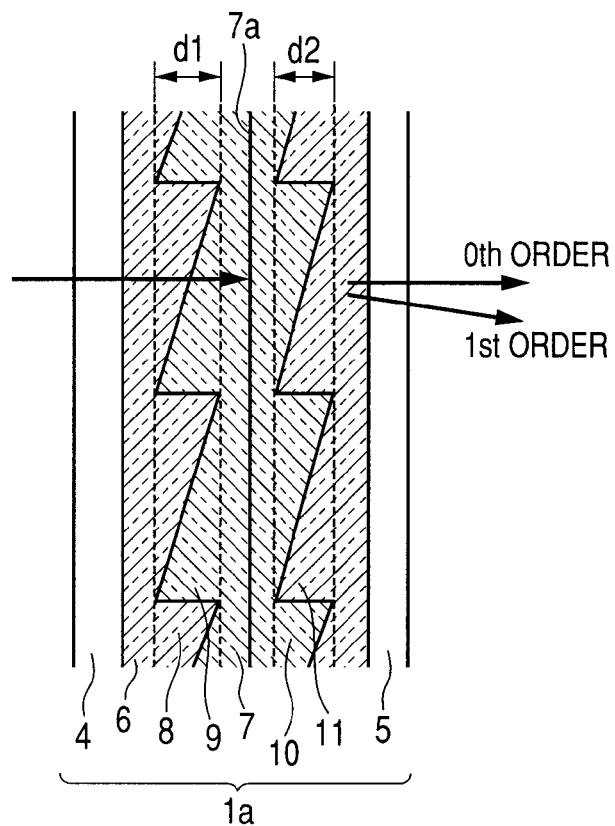
FIG. 4A is a schematic cross sectional view illustrating the diffractive optical element of the present invention.

FIG. 4A illustrates a schematic cross sectional view of a diffractive optical element 1a in which a third diffraction grating 10 made of a third material and a diffraction grating 11 made of a fourth material are added to the diffractive optical element illustrated in FIG. 3 as a combination of the second material. The diffractive optical element 1a illustrated in FIG. 4A has a structure in which the diffraction gratings 10 and 11 made of two new materials are disposed between the second diffraction grating 9 (grating base part 7) and the transparent substrate 5 of the diffractive optical element 1 illustrated in FIG. 3. Compared with the diffractive optical element 1 illustrated in FIG. 3, the diffractive optical element 1a illustrated in FIG. 4A further has a structure in which the diffraction grating 10 made of the third material and the diffraction grating 11 made of the fourth material are cemented in intimate contact with each other sandwiching the grating surface thereof. The third diffraction grating 10 and the second diffraction grating 9 are cemented in intimate contact via a flat surface 7a, and the fourth diffraction grating 11 and the transparent substrate 5 are also cemented in intimate contact in the same manner. Further, grating thicknesses of the third diffraction grating 10 and the fourth diffraction grating 11 are both d2.

The refractive indices of the third and fourth materials for the wavelengths of the d-line, the F-line, and the C-line are denoted by n3d, n3F, n3C, n4d, n4F, and n4C, respectively. If the diffraction grating having the grating thickness d2 (>0) is used, conditional equations for satisfying the difference in optical path length at the individual wavelengths are given as follows:

$$(N2d-n1d)d1 + (n4d-n3d)d2 = m \times \lambda d \quad \text{(x4a)}$$

$$(N2F-n1F)d1 + (n4F-n3F)d2 = m \times \lambda F \quad \text{(x4b)}$$

$$(N2C-n1C)d1 + (n4C-n3C)d2 = m \times \lambda C \quad \text{(x4c)}$$

In this case, if the refractive indices of the third and fourth materials are selected so as to correct only the deviations $\alpha F$ and $\alpha C$ of the difference in optical path length for the F-line and the C-line wavelengths, the diffractive optical element having high diffraction efficiency in a wide wavelength range is obtained.

Subtracting each term of the equations (x4a) to (x4c) from the equations (x4aa) to (x3 cc), the conditions for obtaining a desired value of the difference in optical path length for the d-line, F-line, and C-line wavelengths are obtained as follows:

$$(n4d-n3d) = 0 \quad \text{(x5a)}$$

$$(n4F-n3F)d2 = -\alpha F \quad \text{(x5b)}$$

$$(n4C-n3C)d2 = \alpha C \quad \text{(x5c)}$$

In this case, refractive indices of the third material and the fourth material are the same at a wavelength of the d-line. Therefore, the refractive index difference is a very small value also at a wavelength of the F-line or the C-line. Therefore, influence of undesirable light becomes very small also in the case where light that does not contribute to imaging enters the wall surface of the grating side surface of the diffraction gratings 10 and 11 made of the third material and the fourth material.

With the structure described above, in the diffraction gratings 8 and 9 made of the first material and the second material having a large refractive index difference, the grating thickness can be configured small, and a desired difference in optical path length can be obtained in a wide wavelength range. Therefore, it is possible to obtain the diffractive optical element having high diffraction efficiency in a wide wavelength range, in which generation of undesirable light by the grating side surface is reduced. In the diffractive optical element 1a having the above-mentioned structure as illustrated in FIG. 4A, four types of materials are used for forming the diffraction gratings. Among them, two materials may be the same material so that the diffractive optical element can be formed by a simpler structure. For instance, in the structure of FIG. 4A, the diffraction grating 9 made of the second material and the diffraction grating 10 made of the third material are cemented in intimate contact via the flat surface. If the second material and the third material are the same, a simpler structure can be realized.

Further, in the diffractive optical element illustrated in FIG. 4A, the diffraction grating 8 and the diffraction grating 9 constituting the first combination part are in intimate contact via the grating surfaces thereof, but this structure is not always essential. For instance, when the second material forming the diffraction grating 9 and the fourth material forming the diffraction grating 11 are the same in the diffractive optical element illustrated in FIG. 4A, the conditional equation for satisfying the difference in optical path length for the d-line is as below:

$$(N2d-n1d)d1 + (N2d-n3d)d2 = m \times \lambda d \quad \text{(x4aa)}$$

This equation can be expressed as follows:

$$(n3d-n1d)d1 + (N2d-n3d) \times (d1+d2) = m \times \lambda d \quad \text{(x4aaa)}$$

Figure 4B:
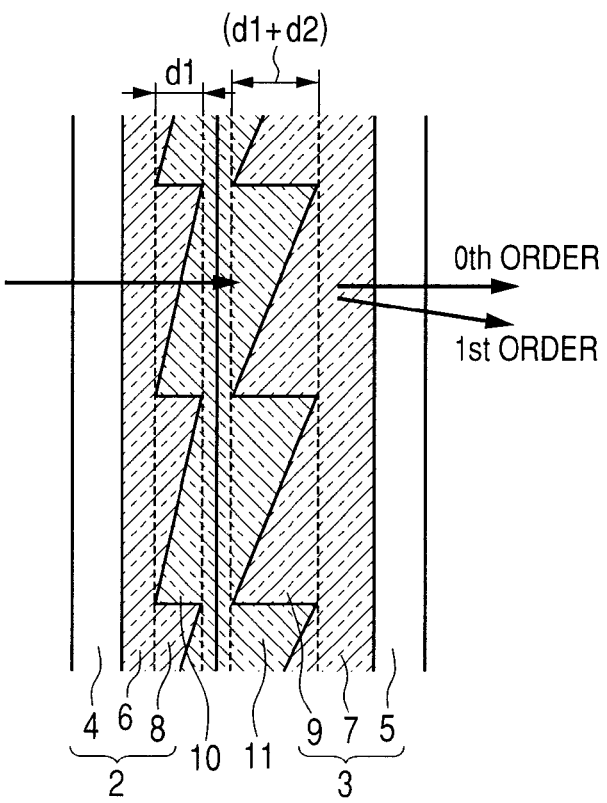
FIG. 4B is a schematic cross sectional view illustrating the diffractive optical element of the present invention.

FIG. 4B illustrates the diffractive optical element that satisfies the difference in optical path length in the equation (x4aaa). In the diffractive optical element illustrated in FIG. 4B, the first diffraction grating 8 made of the first material and the third diffraction grating 10 made of the third material are cemented in intimate contact sandwiching the grating surfaces thereof. In addition, the second diffraction grating 9 made of the second material and the fourth diffraction grating 11 made of the third material are also cemented in intimate contact sandwiching the grating surfaces thereof in the same manner.

Further, the diffraction grating 10 and the diffraction grating 11 are cemented in intimate contact via the flat surface. In this case, the diffraction grating 10 and the diffraction grating 11 are made of the same material. Therefore, if the flat surface is eliminated and the diffractive optical element is manufactured by integral molding, the diffractive optical element having a simpler structure can be obtained. The grating thickness of the first diffraction grating 8 is d1, and the grating thickness of the second diffraction grating 9 is d1+d2. As described above, it is understood that a desired difference in optical path length can be obtained also in the diffractive optical element as illustrated in FIG. 4B in which the diffraction grating 8 and the diffraction grating 9 constituting the first combination of the materials are disposed so as to be separated from each other. In addition, in the diffractive optical element illustrated in FIG. 4B, the equations (x5a) to (x5c) can be expressed as follows:

$$(N2d-n3d)=0 \quad (x5aa)$$

$$(N2F-n3F)d2=-\alpha F \quad (x5bb)$$

$$(N2C-n3C)d2=\alpha C \quad (x5cc)$$

As the above-mentioned equations (x5aa) to (x5 cc) shows, the refractive index N2 of the second material and the refractive index n3 of the third material have close values. Therefore, influence of the undesirable light becomes very small also in the case where light that does not contribute to imaging enters the wall surface of the grating side surface of the diffraction grating 11 and the diffraction grating 9.

Next, embodiments of the diffractive optical element of the present invention are described. Refractive indices at a wavelength w (nm) of the materials M1A and M1B forming the two diffraction gratings of the first combination part constituting the diffractive optical element of the present invention are denoted by N1Aw and N1Bw, respectively, and Abbe numbers of the same are denoted by v1A and v1B, respectively (v1A>v1B). Refractive indices for the d-line of the materials M2A and M2B forming the two diffraction gratings of the second combination part are denoted by N2Ad and N2Bd, respectively, and Abbe numbers of the same are denoted by v2A and v2B, respectively (v2A>v2B).

Then, the following equation is satisfied:

$$N1Aw-N1Bw=0 \quad (1)$$

for wavelength w satisfying the following condition.

$$370(nm)<w<730(nm)$$

Further, the following conditional expressions are satisfied:

$$16<(v1A-v1B)<75 \quad (2)$$

$$0.03<|N2Ad-N2Bd|<0.5 \quad (3)$$

$$16<(v2A-v2B)<75 \quad (4)$$

The diffractive optical element of the present invention should satisfy the conditional expressions (1) to (4), and it is more preferred to satisfy one or more of the following conditional expressions. The grating thickness in the direction in which the light beam passes through the grating parts of the multiple diffraction gratings is denoted by dtot. A total sum of heights of the grating side surfaces of the multiple diffraction gratings in the region where a refractive index difference between materials of the diffraction gratings on both sides of the grating side surface is 0.03 or larger is denoted by dH.

In a region j (j=1, 2 ... n (positive integer)) where the grating part structures of the multiple diffraction gratings face each other with the grating side surface interposed therebetween, the critical angle for the d-line between the grating part structures facing each other is denoted by θj (rad), the height of the grating side surface is denoted by Hj (μm), and the working order is denoted by m. In this case, it is preferred to satisfy one or more of the following conditional expressions.

$$1.3<(N2Ad-N2Bd)\times(v2A-v2B)<35 \quad (5)$$

$$dtot<30(\mu m) \quad (6)$$

$$0.1<dH/dtot<0.7 \quad (7)$$

$$dH<9(\mu m) \quad (8)$$

$$|1A-v2A|<15 \quad (9)$$

$$|1B-v2B|<15 \quad (10)$$

$$[\Sigma\{(\pi/2-\theta j)\times Hj\}]/m<3.5 \quad (11)$$

Embodiment 1

Figures 1A, 1B:
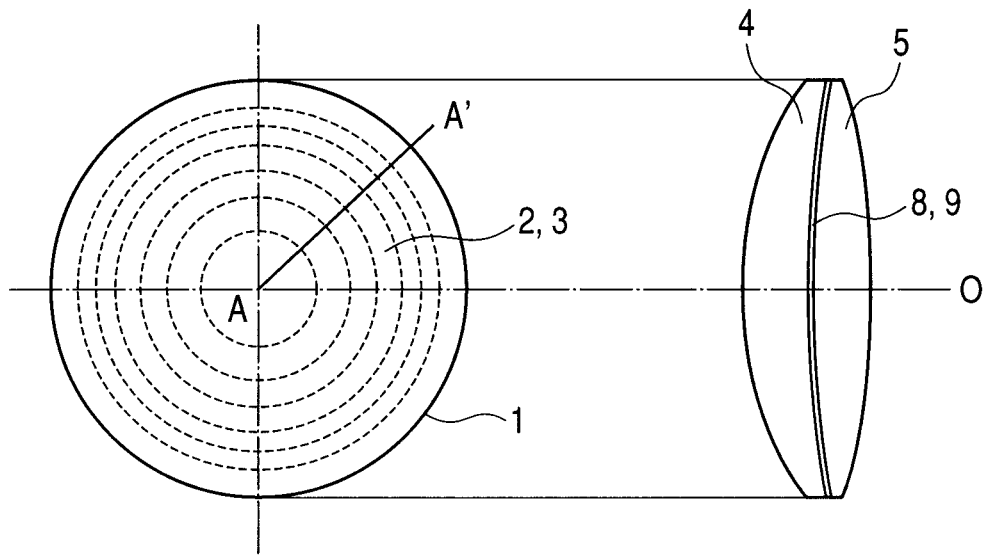
FIG. 1A is a front view of a diffractive optical element according to Embodiment 1 of the present invention.
FIG. 1B is a side view of the diffractive optical element according to Embodiment 1 of the present invention.
Figure 2:
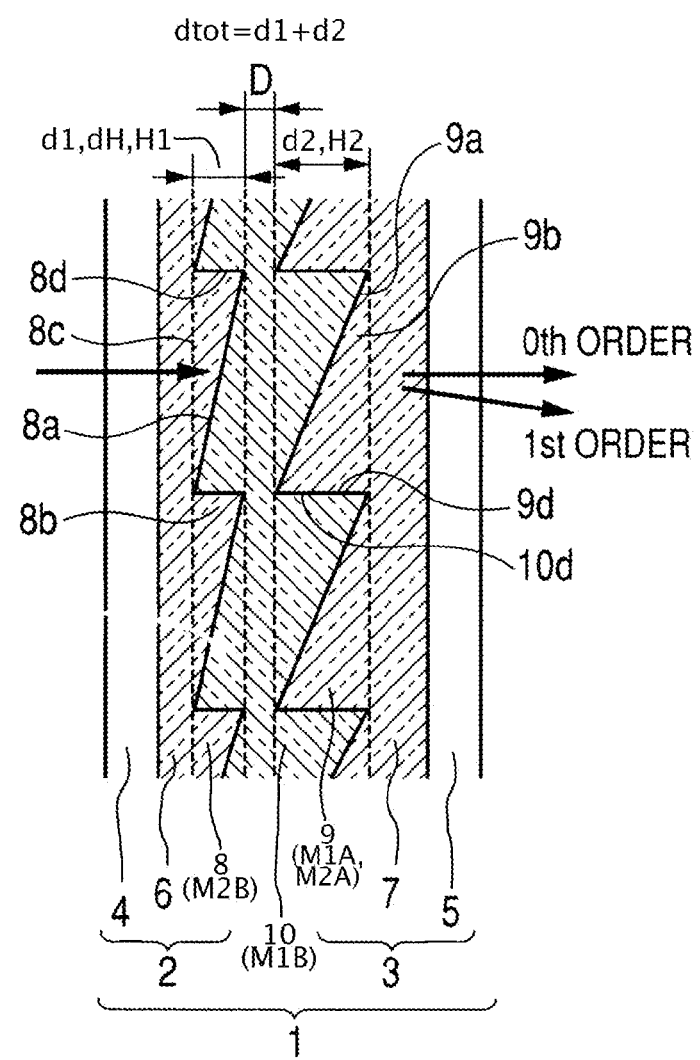
FIG. 2 is a partial cross sectional view of the diffractive optical element according to Embodiment 1 of the present invention.

Next, a specific structure of Embodiment 1 is described. FIG. 1A is a front view of the diffractive optical element according to Embodiment 1 of the present invention, and FIG. 1B is a side view of the diffractive optical element illustrated in FIG. 1A. In addition, FIG. 2 illustrates an enlarged cross sectional view of a part of the diffractive optical element illustrated in FIG. 1A which is viewed from the line A-A'. Note that FIG. 2 is enlargedly deformed in the grating depth direction of the grating part of the diffraction grating. As illustrated in those diagrams, the diffractive optical element 1 has a structure in which the first element part 2 and the second element part 3 are superposed so that the first diffraction grating 8 and the second diffraction grating 9 formed in the element parts 2 and 3 are in intimate contact to each other sandwiching the third material layer 10 therebetween. In addition, as illustrated in FIG. 2, the first element part 2 includes the first transparent substrate 4, the grating base part 6, and the first diffraction grating 8 that is made of the first material and is formed integrally with the grating base part 6. A grating surface 8a is formed at a boundary part of the first diffraction grating 8 with the third material layer 10.

On the other hand, similarly to the first element part 2, the second element part 3 also includes the second transparent substrate 5, the grating base part 7 disposed on the second transparent substrate 5, and the second diffraction grating 9 that is made of the second material and is formed integrally with the grating base part 7. A grating surface 9a is formed at the boundary part of the second diffraction grating 9 with the third material layer 10. Note that, the third material layer 10 is adapted to have a thickness D between edges formed by the grating surfaces 8a and 9a and grating side surfaces 8d and 9d of the diffraction gratings 8 and 9. The first element part 2, the second element part 3, and the third material layer 10 act as the one diffractive optical element 1 as a whole. The first diffraction grating 8 and the second diffraction grating 9 have a grating shape having concentric circles, and the grating pitch of the grating part varies in the radial direction so as to have a lens action.

In this embodiment, a wavelength range of the light entering the diffractive optical element 1, namely the working wavelength range is the visible range (having a wavelength from 370 to 730 nm). The materials and the grating thicknesses of the first diffraction grating 8, the second diffraction grating 9, and the third material layer 10 are selected to increase the diffraction efficiency of first order diffraction light in the entire visible range. In the diffractive optical element 1 of Embodiment 1 illustrated in FIG. 2, a condition in which the diffraction efficiency of diffraction light of the diffraction order m becomes maximum for the design wavelength $\lambda_0$ is as follows:

$$(n03-n01)d1+(n02-n03)d2=m\lambda_0 \quad (x6)$$

Here, in the above-mentioned equation (x6), n01 denotes a refractive index of the material forming the first diffraction grating 8 of the first element part 2 with respect to light having a wavelength $\lambda_0$. Further, n02 denotes a refractive index of the material forming the second diffraction grating 9 of the second element part 3 with respect to light having a wavelength $\lambda_0$. Further, n03 denotes a refractive index of the material forming the third material layer 10 with respect to light having a wavelength $\lambda_0$. In addition, d1 denotes a grating thickness of the grating part 8b of the first diffraction grating 8, and d2 denotes a grating thickness of the grating part 9b of the second diffraction grating 9.

In FIG. 2, it is defined that the diffraction order of light being diffracted downward from the 0th order diffraction light is a positive diffraction order, and the diffraction order of light being diffracted upward from the 0th order diffraction light is a negative diffraction order. The sign of addition or subtraction of the grating thicknesses d1 and d2 in the above-mentioned equation (x6) is positive in the case of the grating part 9b of the second diffraction grating 9 having a grating shape in which the grating thickness increases in the direction from top to bottom of the diagram. In the diffractive optical element 1 illustrated in FIG. 2, a resin (having refractive index Nd=1.480 and Abbe number vd=21.7) in which ITO (Indium Tin Oxide) microparticles were mixed in a fluorinated resin was used as the material (M2B) of the first diffraction grating 8. On the other hand, a resin (having refractive index Nd=1.569 and Abbe number vd=47.9) in which $ZrO_2$ microparticles were mixed in an acrylic resin was used as the material (M1A and M2A) of the second diffraction grating 9. In addition, a resin (having refractive index Nd=1.564 and Abbe number vd=20.8) in which ITO microparticles were mixed in an ultraviolet curing resin manufactured by DIC Corporation was used as the material (M1B) of the third material layer 10. In addition, the grating thickness d1 of the diffraction grating 8 is 6.2 μm, the grating thickness d2 of the diffraction grating 9 is 13.7 μm, the interval D between grating side surfaces of the diffraction gratings 8 and 9 in the third material layer 10 is 1.5 μm, and a diffraction pitch P is 100 μm. Here, d1+d2 corresponds to the grating thickness dtot in the conditional expressions (6) and (7). The inclination with respect to the normal of the envelopment surface of the tips of the grating on the grating side surfaces of the diffraction gratings 8 and 9 was set to 0 degrees.

Figure 5:
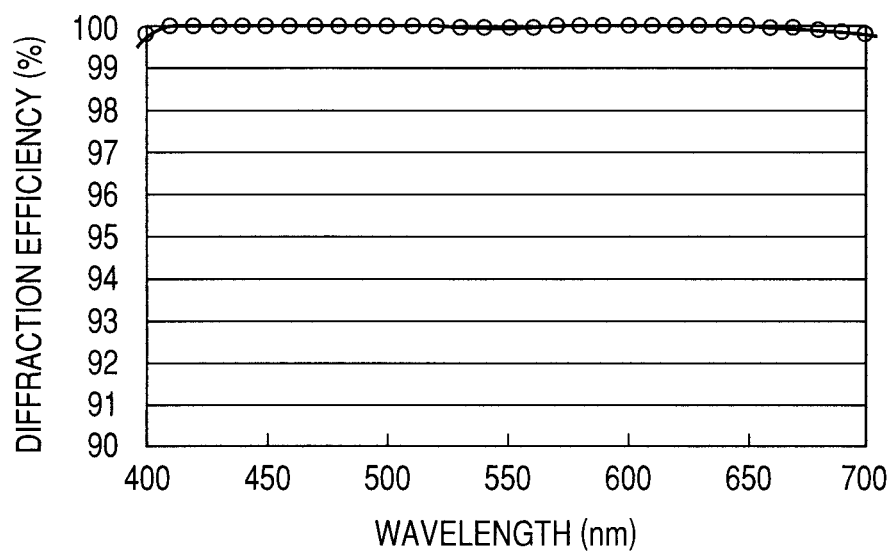
FIG. 5 is a graph of diffraction efficiency of the diffractive optical element according to Embodiment 1 of the present invention.

Next, behavior of light when the light beam used for imaging enters the diffractive optical element 1 of this embodiment is described. It is supposed that the diffractive optical element 1 of this embodiment is disposed in the optical system in which the light beam used for imaging enters at an angle within the range of ±2 degrees with respect to the normal of the envelopment surface of the tip part of the grating of the diffraction grating. The grating thickness d1 and the grating thickness d2 are designed to obtain an optimal diffraction characteristic when the light enters at a centroid rays angle of 0 degrees that is an average of the maximum incident angle +2 degrees and the minimum incident angle −2 degrees. Further, the inclination with respect to the normal of the envelopment surface of the tips of the grating on the grating side surfaces of the diffraction gratings 8 and 9 is set to 0 degrees so as to be adjusted to the centroid rays angle similarly to the grating thickness. In this case, the light beam that is slightly deflected from the incident angle ±2 degrees and goes out from the diffraction grating at the first order diffraction angle reaches the image plane (evaluation plane). In other words, a light beam having a diffraction angle in the range of approximately ±2 degrees with respect to the normal of the envelopment surface of the tip part of the grating with reference to the diffraction angle of 0 degrees and its vicinity reaches the imaging plane. FIG. 5 shows diffraction efficiency characteristic of the first order that is the design order when the light beam enters the diffractive optical element 1 according to Embodiment 1 at a right angle to the normal of the envelopment surface of the tips of the grating. As can be seen from the characteristic graph, the diffractive optical element 1 can obtain very high diffraction efficiency in the entire visible range.

Figure 6:
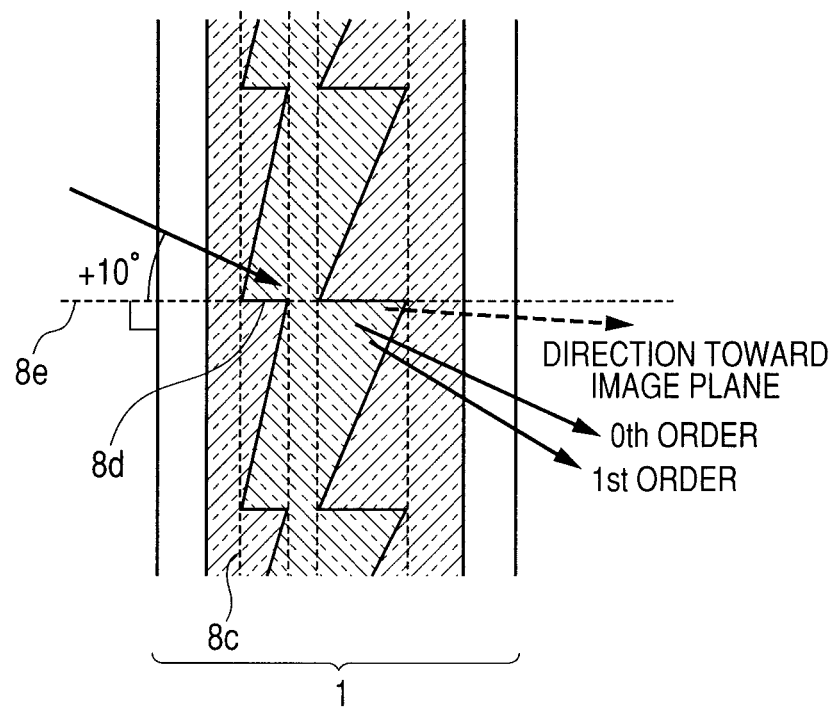
FIG. 6 is a schematic diagram illustrating a manner in which a light beam having an incident angle of +10 degrees enters the diffractive optical element.

Next, the case where the light beam enters at an angle shifted from the incident angle of the light beam used for imaging is described. When the diffractive optical element is used in an optical system, light other than the light beam used for imaging may enter the diffractive optical element. For instance, as illustrated in FIG. 6, it is supposed that the light beam of +10 degrees with respect to the normal of an envelopment surface 8c of the tip part of the grating enters the diffractive optical element 1. In this case, the first order diffraction light of the light beam entering at +10 degrees emerges at approximately 10 degrees with respect to the normal of the envelopment surface 8c of the tip part of the grating, and hence the first order diffraction light hardly reaches the image plane (evaluation plane). However, the emerging light beam from the grating side surface 8d has a certain divergent width. Therefore, even in a construction in which light beam does not reach the image plane (evaluation plane) according to the emerging direction calculated by Snell's law, slight light actually reaches the image plane (evaluation plane). If the intensity of light other than the light beam used for imaging is large, there may be a problem that undesirable light due to the grating side surface 8d deteriorates imaging performance. In particular, if the light beam enters at an angle shifted from the angle formed by the grating side surface 8d, a ratio of the light beam entering the grating side surface 8d increases. As a result, there is a high possibility that the light entering the grating side surface 8d is deflected and reaches the image plane (evaluation plane) as undesirable light. In addition, when the light beam enters the grating side surface 8d from a side of the material having a high refractive index to a side of the material having a low refractive index, if the light beam enters at the critical angle or larger with respect to the normal direction of the grating side surface 8d, the light beam is deflected as total reflection light, and hence undesirable light having high energy is generated.

Figure 7A:
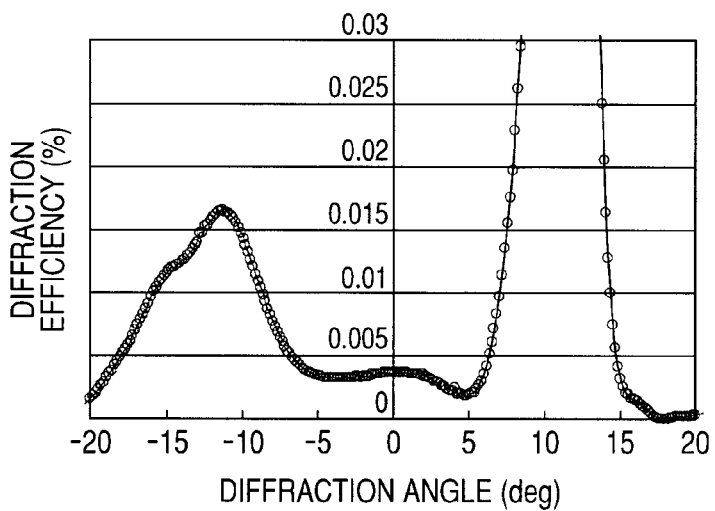
FIG. 7A is a graph of the diffraction efficiency of the diffractive optical element according to Embodiment 1 for a light beam having a light wavelength of 450 nm and an incident angle of +10 degrees.
Figure 7B:
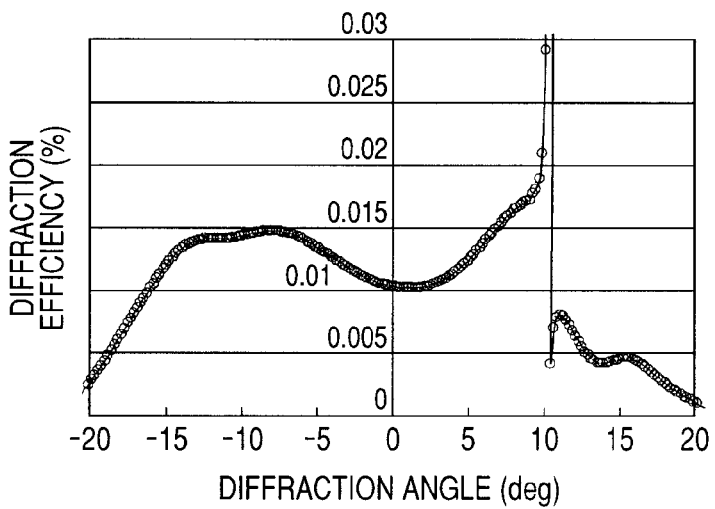
FIG. 7B is a graph of the diffraction efficiency of the diffractive optical element according to Embodiment 1 for a light beam having a light wavelength of 550 nm and an incident angle of +10 degrees.
Figure 7C:
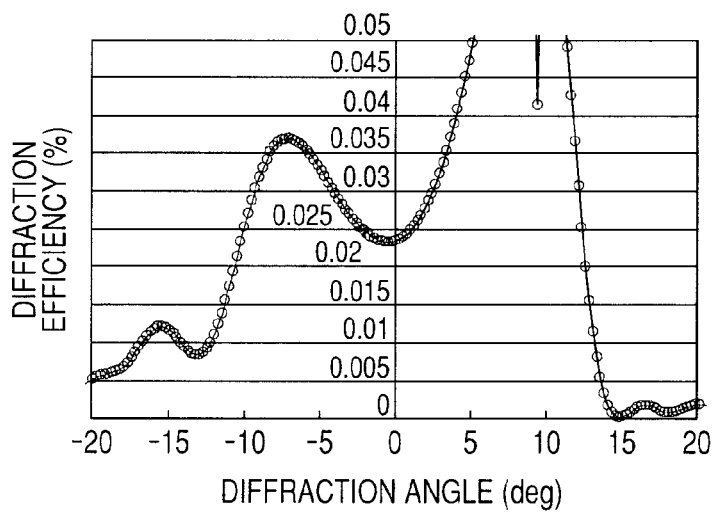
FIG. 7C is a graph of the diffraction efficiency of the diffractive optical element according to Embodiment 1 for a light beam having a light wavelength of 650 nm and an incident angle of +10 degrees.
Figure 8A:
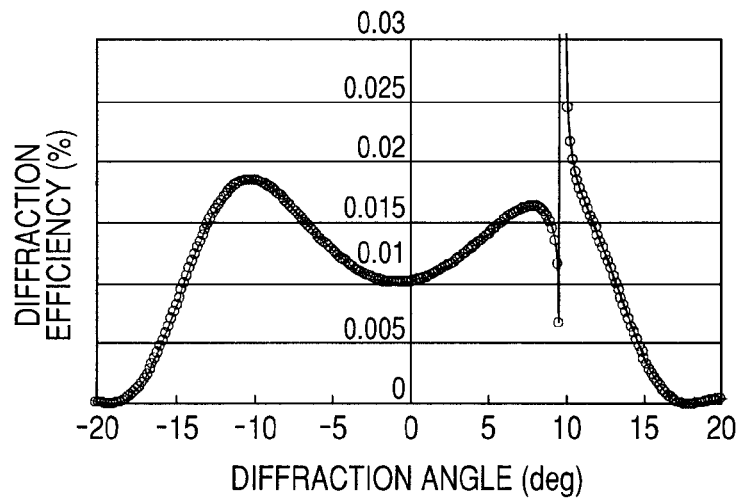
FIG. 8A is a graph of the diffraction efficiency of the diffractive optical element of the comparison example for a light beam having a light wavelength of 450 nm and an incident angle of +10 degrees.
Figure 8B:
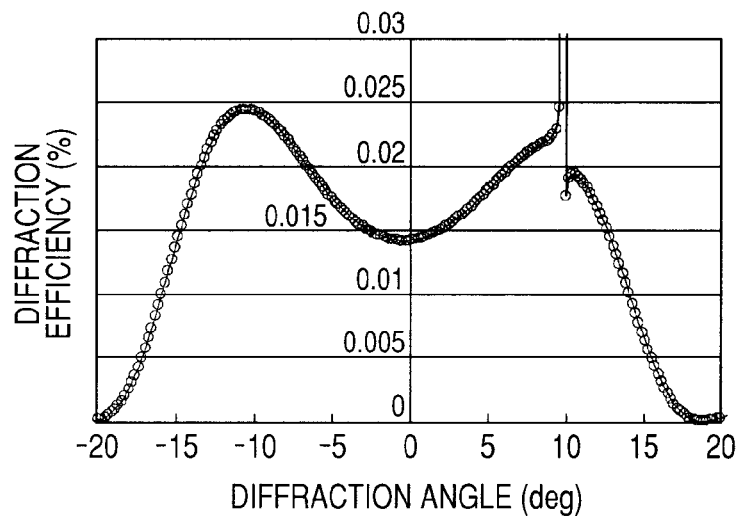
FIG. 8B is a graph of the diffraction efficiency of the diffractive optical element of the comparison example for a light beam having a light wavelength of 550 nm and an incident angle of +10 degrees.
Figure 8C:
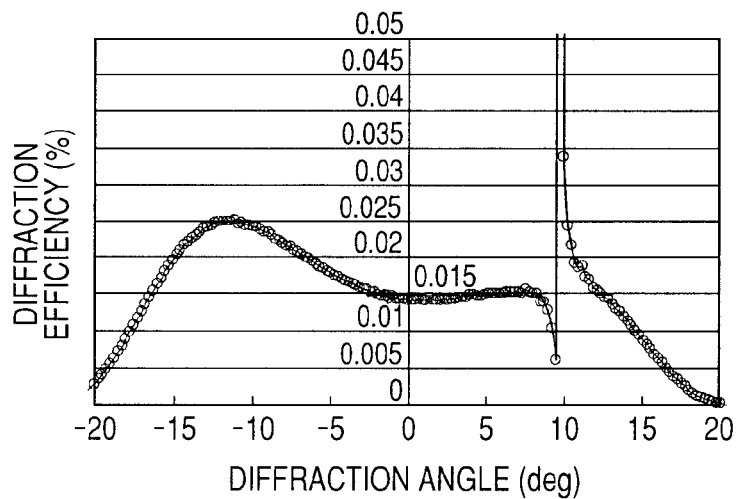
FIG. 8C is a graph of the diffraction efficiency of the diffractive optical element of the comparison example for a light beam having a light wavelength of 650 nm and an incident angle of +10 degrees.

In the above-mentioned diffractive optical element 1, a rigorous coupled wave analysis (RCWA) among rigorous wave calculation methods was used for calculating the diffractive optical element. FIGS. 7A, 7B and 7C show a calculation result of the RCWA calculation in the case where the light beam enters the diffractive optical element 1 according to Embodiment 1 at an angle deviated from the optimal incident angle (+10 degrees). FIG. 7A shows a calculation result of a wavelength of 450 nm, FIG. 7B shows a calculation result of a wavelength of 550 nm, and FIG. 7C shows a calculation result of a wavelength of 650 nm. Further, FIGS. 8A, 8B and 8C show results of similar calculations as a comparison example in the diffractive optical element 1 illustrated in FIG. 3. FIG. 8A shows a calculation result of a wavelength of 450 nm, FIG. 8B shows a calculation result of a wavelength of 550 nm, and FIG. 8C shows a calculation result of a wavelength of 650 nm.

In the diffractive optical element of the comparison example illustrated in FIG. 3, a resin (Nd=1.504, vd=16.3) in which ITO microparticles were mixed in a fluorinated resin was used for the first diffraction grating 8. On the other hand, a resin (Nd=1.568, vd=45.1) in which $ZrO_2$ microparticles were mixed in an acrylic resin was used for the second diffraction grating 9. The grating thickness d0 is 9.3 μm, and the angle of the grating side surface 8d with respect to the normal of the envelopment surface 8c of the tip part of the grating is 0 degrees. In the RCWA calculation results of Embodiment 1 and the conventional example shown in FIGS. 7A, 7B, 7C, 8A, 8B and 8C, it is understood that diffraction efficiency at the diffraction angle of 0 degrees and its vicinity of light reaching the image plane at the wavelengths of 450 nm and 550 nm is lower in Embodiment 1. As can be seen from this fact, the diffractive optical element of this embodiment can reduce occurrence of the undesirable light in a wide wavelength range when light other than the light beam used for imaging enters. Further, in the first diffraction grating 8 illustrated in FIG. 3, the material of very high dispersion having an Abbe number of 16.3 is used. However, in Embodiment 1, the material of lower dispersion having an Abbe number of approximately 21 is used, and hence the diffractive optical element 1 can be manufactured easily. In this embodiment, the centroid rays are set to be 0 degrees with respect to the normal of the envelopment surface 8c of the tips of the grating of the grating side surface 8d of the diffraction gratings 8 and 9, but the effect of the present invention is not limited to this.

Next, it is supposed that the diffractive optical element of the present invention is used in the optical system in which the light beam enters at an angle within the range from +5 to +15 degrees with respect to a normal 8e of the envelopment surface 8c of the tips of grating. If the centroid rays angle is set to +10 degrees in this case, the shape of the grating side surface 8d is adapted to have an angle with respect to the normal 8e of the envelopment surface 8c of the tips of grating that is also set to the +10 degrees of the centroid rays angle, and hence occurrence of the undesirable light can be reduced similarly to Embodiment 1. In addition, the diffractive optical element 1 of this embodiment is mainly used in the visible range. Therefore, it is preferred to use a combination of materials having a small refractive index difference in the entire visible range. For this reason, refractive indices of two materials among three materials of the diffraction gratings 8 and 9 and the diffraction grating 10 have the same points in the range of wavelength from 370 to 730 nm (conditional equation (1)), and hence the refractive index difference in the entire visible range becomes sufficiently small.

Specifically, the material satisfying the conditional equation (1) is used for the materials (M1A and M1B) of the first combination part (diffraction gratings 9 and 10), and hence undesirable light generated from the grating side surface can be reduced. In addition, it is necessary to increase the dispersion difference in the first combination part to some extent so as to obtain a sufficient difference in optical path length in the entire visible range. Therefore, it is necessary that the Abbe numbers v1A and v1B satisfy the conditional expression (2). If the lower limit condition in the conditional expression (2) is not satisfied, it is difficult to obtain sufficient dispersion power as the entire diffractive optical element. If the upper limit condition in the conditional expression (2) is not satisfied, the dispersion difference increases, resulting in a further increase in the refractive index difference due to variation of the wavelength. As a result, generation of undesirable light increases. It is more preferred to set the numerical range in the conditional expression (2) as follows:

$$20<(v1A-v1B)<60 \tag{2a}$$

In addition, it is preferred that the grating side surface 9d of the second diffraction grating 9 and a grating side surface 10d of the third diffraction grating 10 be disposed close to each other in the grating pitch direction. In this embodiment, the second diffraction grating 9 and the third diffraction grating 10 are cemented in intimate contact. In the diffractive optical element 1 according to Embodiment 1, the refractive index difference between the first grating material of the first diffraction grating 8 and the second grating material of the second diffraction grating 9 forms the most part of the difference in optical path length. If the diffractive optical element 1 is formed of only the material having a small refractive index difference, it is necessary to increase the grating thickness to obtain a sufficient difference in optical path length, which may cause an increase of undesirable light. In order to reduce the grating thickness, it is preferred to use the second combination part in which the refractive index difference is within the range defined by the conditional expression (3) as described above. When the diffractive optical element 1 is used in the visible range, the d-line or its vicinity is set to the design wavelength in many cases. In such cases, it is preferred to set the refractive index difference at the d-line as the design wavelength to the condition satisfying the expression (3), so as to obtain high diffraction efficiency in the entire visible range and the higher degree of freedom in selecting materials. If the lower limit condition in the expression (3) is not satisfied, a sufficient difference in optical path length cannot be obtained, so that the grating thickness is inevitably increased. On the contrary, if the upper limit condition in the expression (3) is not satisfied, it is difficult to select an appropriate material. It is more preferred to set the range of the numerical value in the conditional expression (3) as follows:

$$0.04<|N2Ad-N2Bd|<0.3 \tag{3a}$$

In addition, it is necessary to increase the dispersion difference between the two materials to some extent. Otherwise, it is difficult to obtain a sufficient difference in optical path length in the entire visible range. Therefore, as described above, it is preferred that the Abbe numbers v2A and v2B satisfy the conditional expression (4). If the lower limit condition in the conditional expression (4) is not satisfied, sufficient dispersion power cannot be obtained as the entire diffraction grating. If the upper limit condition is not satisfied, it is difficult to select appropriate materials. It is more preferred to set the numerical range in the conditional expression (4) as follows:

$$20<(v2A-v2B)<60 \tag{4a}$$

Note that embodiments which will be described later also satisfy the above-mentioned conditional expressions (1) to (4). It is preferred that the diffractive optical element of this embodiment use a combination of a material having a high refractive index with low dispersion and a material having a low refractive index with high dispersion in order to obtain a desired difference in optical path length by the diffraction grating including the two materials, as described above with reference to the equations (x3a) to (x3i). The same is true for the diffractive optical element 1 of this embodiment, and it is preferred that at least one combination of materials in the second combination of materials that forms the most part of the difference in optical path length satisfy the conditional expression (5). Further, the diffractive optical element of this embodiment also aims at reducing the undesirable light generated from the grating side surface. Therefore, it is preferred that the grating thickness be lower. When the sum of the grating thicknesses of the grating parts in the passing direction of the light beam is denoted by dtot, generation of undesirable light can be reduced by setting the grating thickness dtot to have a value within the range defined by the conditional expression (6). In particular, undesirable light due to the grating side surface becomes larger as the refractive index difference between the materials forming the grating side surface is larger. Therefore, the undesirable light can be reduced preferably by decreasing the height of the grating side surface having a large refractive index difference. Specifically, when the sum of heights of the grating side surfaces in the region where the refractive index difference is 0.03 or larger is denoted by dH, undesirable light can be reduced appropriately if the ratio of the height dH to the entire grating thickness dtot satisfies the conditional expression (7). Further, if the value of the height dH is within the range of conditional expression (8), more appropriate performance can be obtained. In addition, if the material forming the diffractive optical element satisfies at least one of the conditional expression (9) and the conditional expression (10), the material selection can be facilitated, so that a diffractive optical element that can be manufactured easily can be obtained.

If the upper limit condition in the conditional expression (9) is not satisfied, it becomes necessary to use a material having very low dispersion (material having a large Abbe number) for one of the material M1A and the material M2A. Therefore, it becomes difficult to manufacture the material. If the upper limit condition in the conditional expression (10) is not satisfied, it becomes necessary to use a material having very high dispersion (material having a small Abbe number) for one of the material M1B and the material M2B. Therefore, it becomes difficult to manufacture the material. In addition, four types of materials are used in the above description, but the present invention is not limited to this. The present invention is characterized in selection of a combination part of the two types of materials of the first combination part (M1A and M1B) having a small refractive index difference with a large dispersion difference and the second combination part (M2A and M2B) having a large refractive index difference with a large dispersion difference. In other words, for example, two types of material combinations can be obtained even when three types of materials are used, which is desirable because the structure is further simplified. The diffractive optical element 1 according to Embodiment 1 uses a combination of materials having a small refractive index difference with a large dispersion difference and a combination of materials having a large refractive index difference with a large dispersion difference among three materials. In other words, in the first combination part (M1A and M1B) including the diffraction gratings 9 and 10 having a small refractive index difference and a large dispersion difference, a material having a large Abbe number is regarded as M1A (second material). In the second combination part (M2A and M2B) formed by the diffraction gratings 9 and 8 having a large refractive index difference and a large dispersion difference, M2A that is a material having a large Abbe number is set to be the same material of M1A. Therefore, the diffractive optical element 1 having a simple structure is obtained by the small number of materials. Note that, it is preferred that embodiments described later also satisfy the above-mentioned conditional expressions (5) to (10).

Embodiment 2

Figure 9:
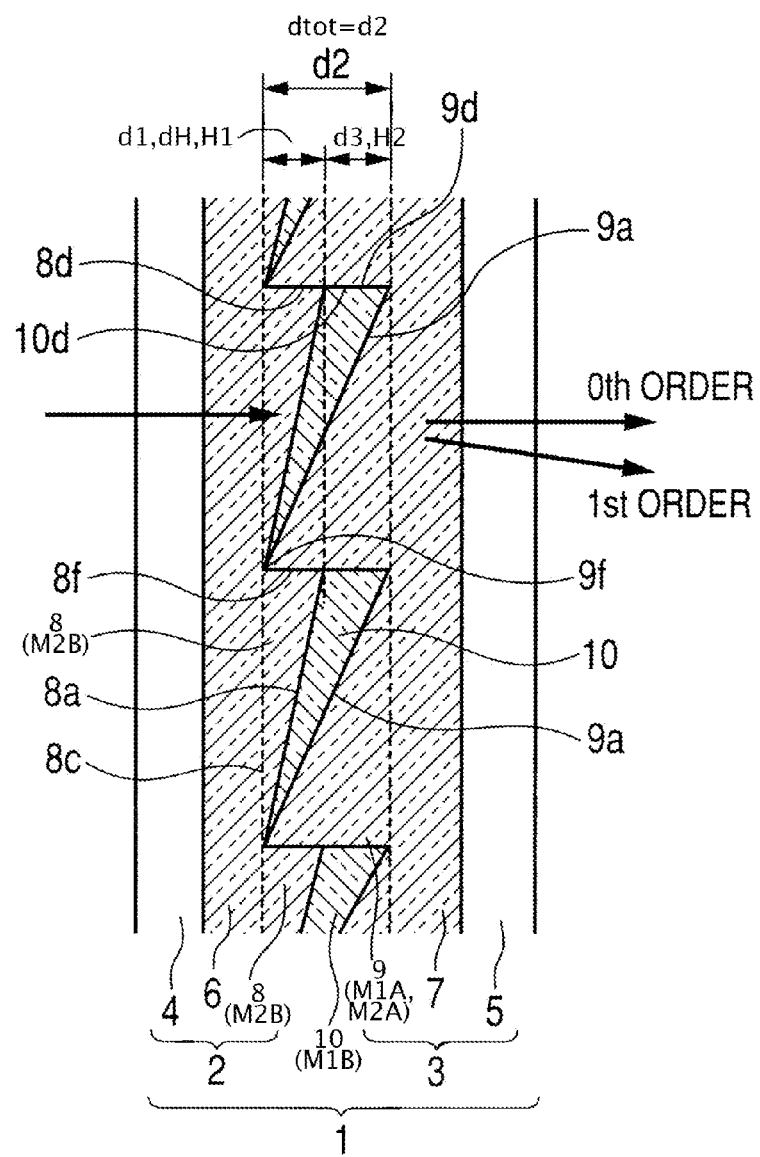
FIG. 9 is a partial cross sectional view of a diffractive optical element according to Embodiment 2 of the present invention.

As for the RCWA calculation result when the light (+10 degrees) other than the light beam used for imaging enters the diffractive optical element 1, the light having a wavelength of 650 nm causes more undesirable light in Embodiment 1 than in the reference example. This is due to the slight difference in refractive index between the second material forming the diffraction grating 9 and the third material layer 10. FIG. 9 is a cross sectional view of a main part of the diffractive optical element according to Embodiment 2 of the present invention. The structure illustrated in FIG. 9 has the same material and shape as that of Embodiment 1, which includes the diffraction grating 8 made of the first material (M2B) and the diffraction grating 9 made of the second material (M1A, M2A). Further, the material (M1B) forming the third material layer (third diffraction grating) 10 is also the same as in Embodiment 1. The first diffraction grating 9 and the third material layer 10 correspond to the first combination part, while the first diffraction grating 9 and the diffraction grating 8 correspond to the second combination part.

In Embodiment 1 illustrated in FIG. 2, in the third material layer (M1B) 10, the thickness is set to D between edges formed by the grating surfaces 8a and 9a and the grating side surfaces 8d and 9d of the diffraction gratings 8 and 9. In contrast, in Embodiment 2, the diffraction grating (M2B) 8 and the diffraction grating (M1A, M2A) 9 are disposed close to each other, and hence a grating valley part 8f of the diffraction grating 8 and a grating peak part 9f of the diffraction grating 9 are disposed adjacent to each other. As a result, the grating side surface 10d of the grating part including the grating side surface 8d of the diffraction grating 8 and the third material layer 10 is disposed close to the grating side surface 9d of the diffraction grating 9 in the grating pitch direction. In this case, a height d3 of the grating side surface 10d which is adjacent to the diffraction grating 9 and the third material layer (M1B) 10 is 13.7 µm in Embodiment 1 that is the same as the height of the grating side surface 9d of the diffraction grating 9. In contrast, the height d3 is 7.5 µm in Embodiment 2 that is smaller. As described above, in Embodiment 1, the refractive index difference is set to be small in the grating side surface 10d between the diffraction grating 9 and the third material layer 10, and hence occurrence of undesirable light is rare. However, if the wavelength varies, the refractive index difference is increased a little, and hence undesirable light is generated slightly. In this case, if the structure as illustrated in FIG. 9 is adopted, influence of the refractive index difference between the second material of the diffraction grating 9 and the third material 10 can be reduced, and hence the occurrence of the undesirable light can be reduced. The equation satisfying the difference in optical path length in Embodiment 2 is as follows:

$$n02 \times d2 - \{n01 \times d1 + n03 \times (d2 - d1)\} = m\lambda_0 \quad (x7)$$

It is understood that the equation (x7) can be transformed into the same equation as the equation (x6). Therefore, the diffraction efficiency of the design order diffraction light can be substantially the same value as that of the diffractive optical element according to Embodiment 1.

Figure 10A:
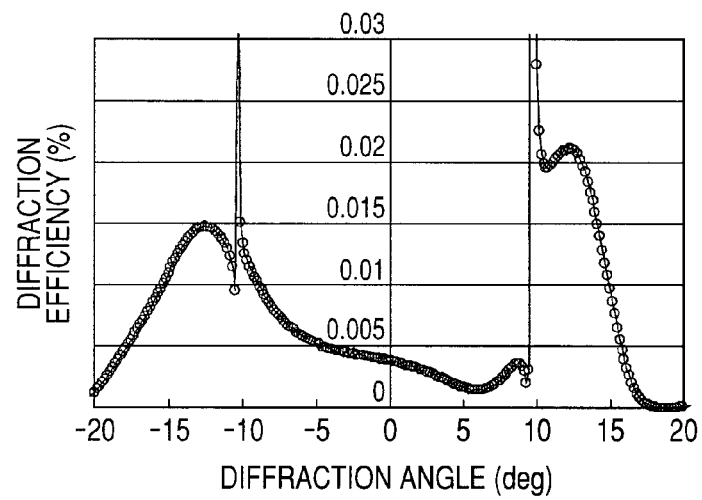
FIG. 10A is a graph of the diffraction efficiency of the diffractive optical element according to Embodiment 2 for a light beam having a light wavelength of 450 nm and an incident angle of +10 degrees.
Figure 10B:
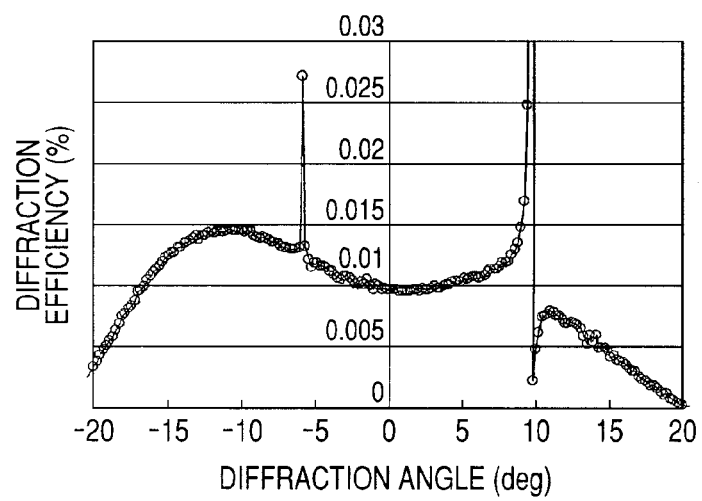
FIG. 10B is a graph of the diffraction efficiency of the diffractive optical element according to Embodiment 2 for a light beam having a light wavelength of 550 nm and an incident angle of +10 degrees.
Figure 10C:
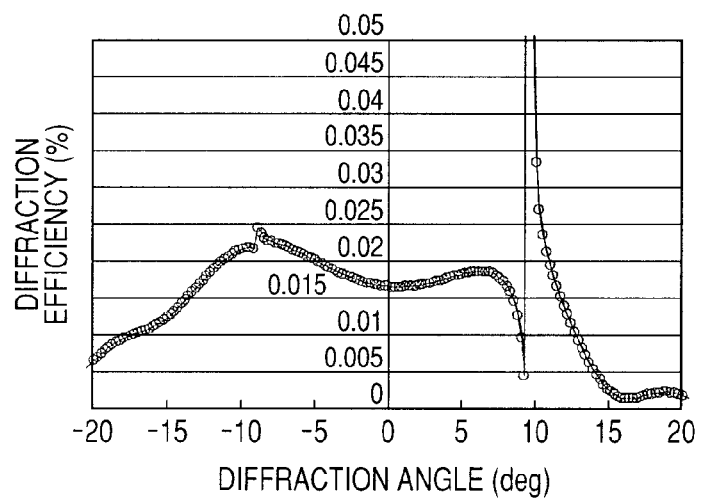
FIG. 10C is a graph of the diffraction efficiency of the diffractive optical element according to Embodiment 2 for a light beam having a light wavelength of 650 nm and an incident angle of +10 degrees.

Next, the case is described where the light beam enters the diffractive optical element 1 illustrated in FIG. 9 at an angle deviated from the incident angle of the light beam used for imaging. Specifically, it is supposed that the light beam at +10 degrees with respect to the normal of the envelopment surface of the diffraction tip part of the grating enters the diffractive optical element 1. Here, +10 degrees is the same as the light beam incident direction illustrated in FIG. 6. If the light beam enters the diffractive optical element 1 illustrated in FIG. 9 from the left side, it means that the light beam enters at an angle of 10 degrees from top of FIG. 9. FIGS. 10A, 10B, and 10C illustrate calculation results of the RCWA calculation in the case where the light beam enters the diffractive optical element 1 according to Embodiment 2 at an angle (+10 degrees) deviated from the optimal incident angle. FIG. 10A illustrates the calculation result at a wavelength of 450 nm, FIG. 10B illustrates the calculation result at a wavelength of 550 nm, and FIG. 10C illustrates the calculation result at a wavelength of 650 nm. The calculation results of Embodiment 2 illustrated in FIGS. 10A, 10B, and 10C are compared with the calculation results of the comparison example illustrated in FIGS. 8A, 8B, and 8C. As for the diffraction efficiency of the light reaching the image plane at the diffraction angle of 0 degrees and its vicinity, the results at wavelengths of 450 nm and 550 nm both show lower values in Embodiment 2, and the result at a wavelength of 650 nm is substantially the same as that in the comparison example. Comparing Embodiment 1 with Embodiment 2, the calculation result in Embodiment 2 shows the effect of reducing the undesirable light at wavelengths of 450 nm and 550 nm similarly to Embodiment 1 with respect to the reference example. In addition, it is understood that the deterioration at a wavelength of 650 nm with respect to the reference example is improved. As can be seen from this fact, the diffractive optical element of this embodiment can reduce the occurrence of undesirable light in a wide wavelength range when light other than the light beam used for imaging enters.

As described above, the height of the grating side surface can be reduced by increasing the refractive index difference between materials forming the grating side surface. In addition, even in the case where the refractive index difference between materials forming the grating side surface is small, undesirable light can be further reduced by decreasing the height of the grating side surface. However, the light beam that enters at an angle of the critical angle or larger with respect to the normal direction of the grating side surface satisfies the total reflection condition, and the undesirable light generated from the grating side surface also has high energy. If the refractive index difference between materials forming the grating side surface is increased, the critical angle is decreased, so that a ratio of occurrence of undesirable light with high energy increases. Therefore, it is preferred that the grating side surface of the diffractive optical element 1 have a small refractive index difference of the material (critical angle be large) and a small grating side surface height. Specifically, by satisfying the above-mentioned conditional expression (11), it is possible to obtain the diffractive optical element in which undesirable light generated from the grating side surface can be reduced appropriately. The same is true about this conditional expression (11) in Embodiment 1 and other embodiments described below.

Embodiment 3

Figure 11:
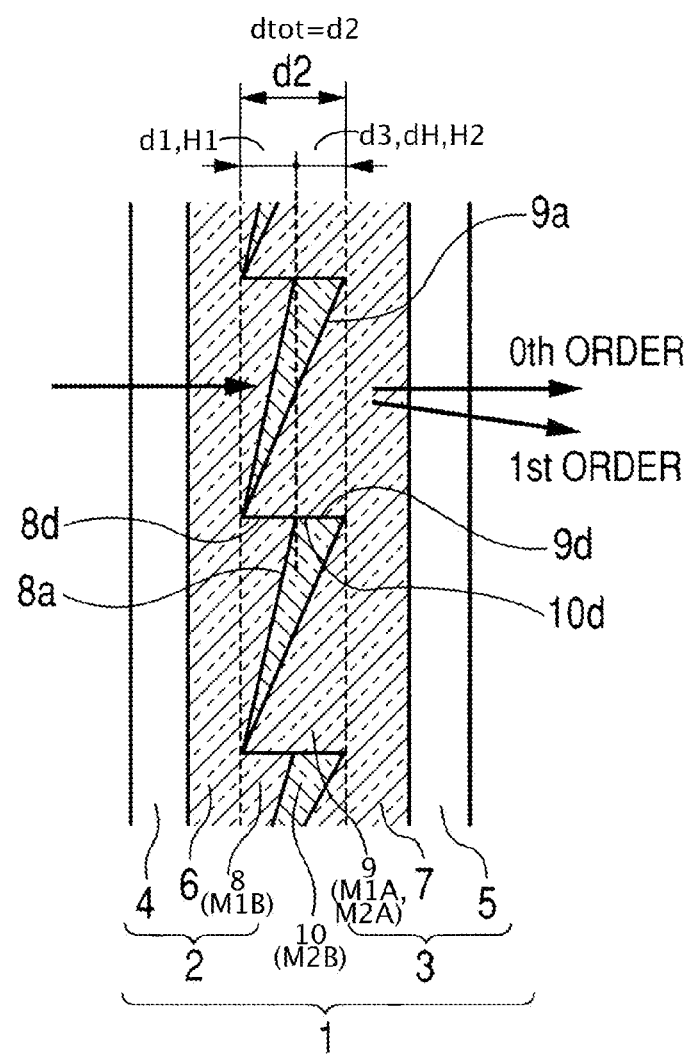
FIG. 11 is a partial cross sectional view of a diffractive optical element according to Embodiment 3 of the present invention.

Embodiment 2 described above has the structure in which the second diffraction grating 9 and the third material layer 10 with a small refractive index difference are cemented in intimate contact so as to sandwich the grating surface 9a, but the diffractive optical element of the present invention is not limited to this structure. FIG. 11 is a cross sectional view of a main part of the diffractive optical element 1 according to Embodiment 3 of the present invention. The diffractive optical element 1 according to Embodiment 3 is obtained by reversing the first diffraction grating 8 and the third material layer 10 of the diffractive optical element according to Embodiment 2. In the diffractive optical element 1 illustrated in FIG. 11, a resin (Nd=1.564, vd=20.8) in which ITO microparticles were mixed in an ultraviolet curing resin manufactured by DIC Corporation was used for the first diffraction grating (M1B) 8 and the base part 6. On the other hand, a resin (Nd=1.569, vd=47.9) in which $ZrO_2$ microparticles were mixed in an acrylic resin was used for the second diffraction grating (M1A, M2A) 9 and the base part 7. In addition, a resin (Nd=1.480, vd=21.7) in which ITO microparticles were mixed in a fluorinated resin was used for the third material layer (M2B) 10.

Figure 12:
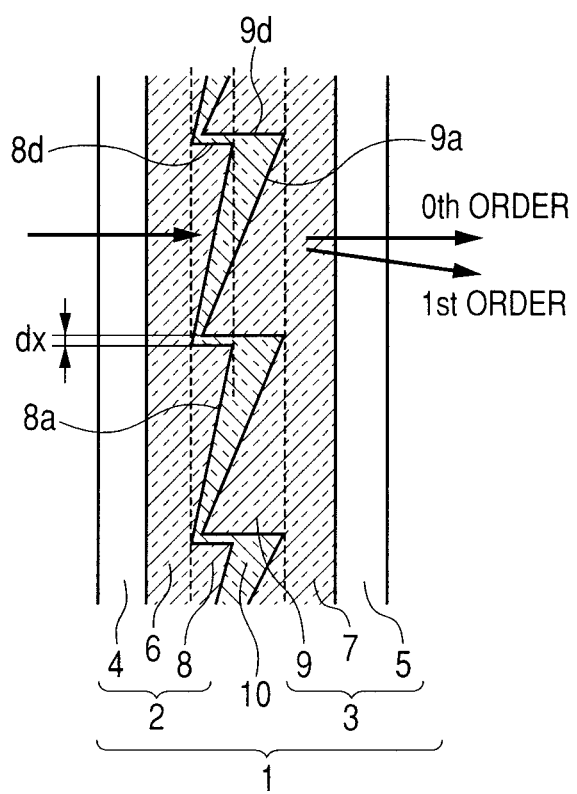
FIG. 12 is a partial cross sectional view of a diffractive optical element according to another structure of Embodiment 3 of the present invention.

Here, the first diffraction grating 8 and the second diffraction grating 9 correspond to the first combination part. The second diffraction grating 9 and the third material layer 10 correspond to the second combination part. In addition, the grating thickness d1 of the diffraction grating 8 is 7.5 μm, the grating thickness d2 of the diffraction grating 9 is 13.7 μm, and the diffraction pitch P is 100 μm. In this case, similarly to Embodiment 2, the grating side surface 10d of the grating constituted of the grating side surface 8d of the diffraction grating 8 and the third material layer 10 is disposed to be close to the grating side surface 9d of the diffraction grating 9 in the grating pitch direction. Therefore, also in Embodiment 3, similarly to Embodiment 2, undesirable light generated from the grating side surface can be reduced in the case where the light beam enters at an angle deviated from the incident angle of the light beam used for imaging. In addition, in the Embodiments 2 and 3, the grating side surface 8d of the first diffraction grating 8 and the grating side surface 9d of the second diffraction grating 9 are cemented in intimate contact, but this embodiment is not limited to this structure. For instance, as illustrated in FIG. 12, the same effect can be obtained by disposing the grating side surface 8d of the first diffraction grating 8 and the grating side surface 9d of the second diffraction grating 9 to be close to each other with a slight interval dx between them in the grating pitch direction. However, if the interval dx increases in this case, the deviation of the difference in optical path length of the light beam passing through the grating surface 8a and the grating surface 9a increases, and hence the diffraction efficiency of the design order diffraction light is deteriorated inappropriately. By setting the interval dx (μm) to a value in the desired range of the following expression, preferred diffraction efficiency can be obtained:

$$0 \leq dx < 5 (\mu m) \quad (12)$$

Further, let P (μm) be the pitch of the diffraction grating, preferred diffraction efficiency can be obtained by satisfying the following range:

$$0 \leq dx/P < 0.05 \quad (13)$$

Embodiment 4

Figure 13:
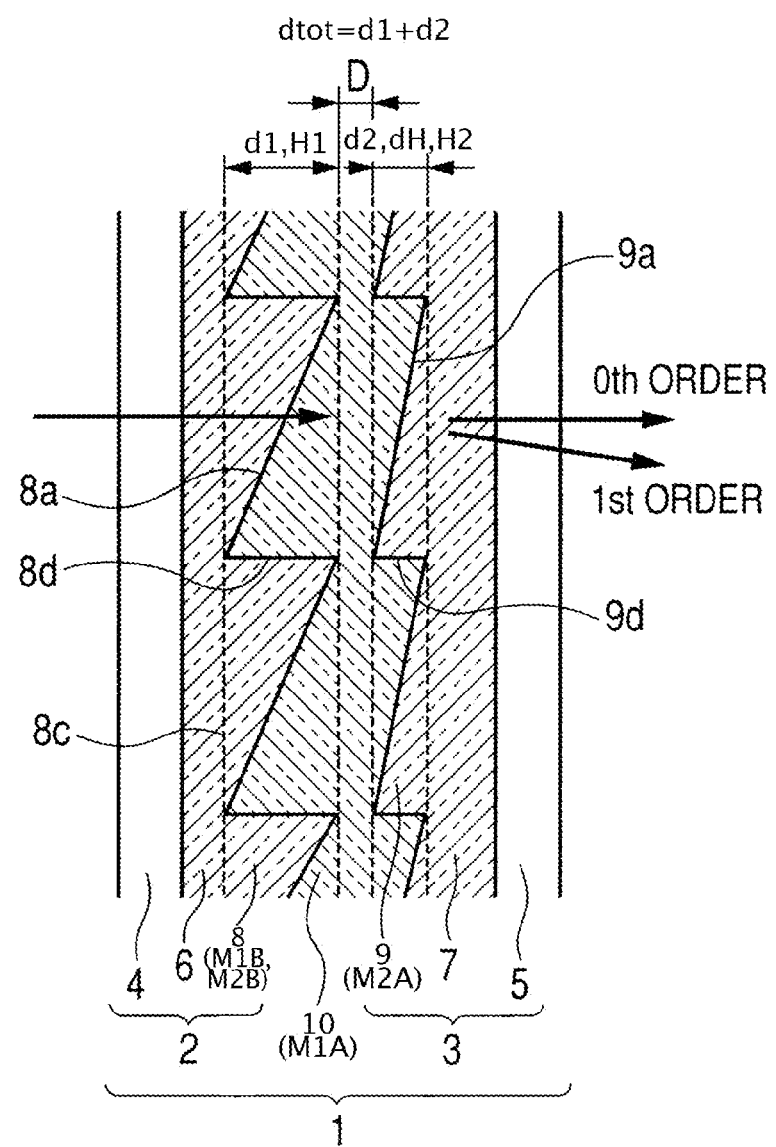
FIG. 13 is a partial cross sectional view of a diffractive optical element according to Embodiment 4 of the present invention.

FIG. 13 is cross sectional view of a main part of the diffractive optical element according to Embodiment 4 of the present invention. In Embodiment 4, similarly to Embodiment 1, the third material layer 10 is disposed between the first diffraction grating 8 and the second diffraction grating 9. Note that the third material layer 10 is set to have a thickness D between edges formed by the grating surfaces 8a and 9a and the grating side surfaces 8d and 9d of the diffraction gratings 8 and 9. In the diffractive optical element 1 illustrated in FIG. 13, a resin (Nd=1.480, vd=21.7) in which ITO microparticles were mixed in a fluorinated resin was used for the first diffraction grating (M1B), (M2B) 8. On the other hand, a resin (Nd=1.634, vd=60.2) in which $Al_2O_3$ microparticles and $Y_2O_3$ microparticles were mixed in polymethylmethacrylate (hereinafter referred to as PMMA) by a volume ratio of 20.5% each was used for the second diffraction grating (M2A) 9. In addition, a resin (Nd=1.481, vd=72.9) in which $Al_2O_3$ microparticles and $Y_2O_3$ microparticles were mixed in a fluorinated resin Cytop (manufactured by Asahi Glass Co., Ltd.) by a volume ratio of 13% each was used for the third material layer (M1A) 10.

Figure 14A:
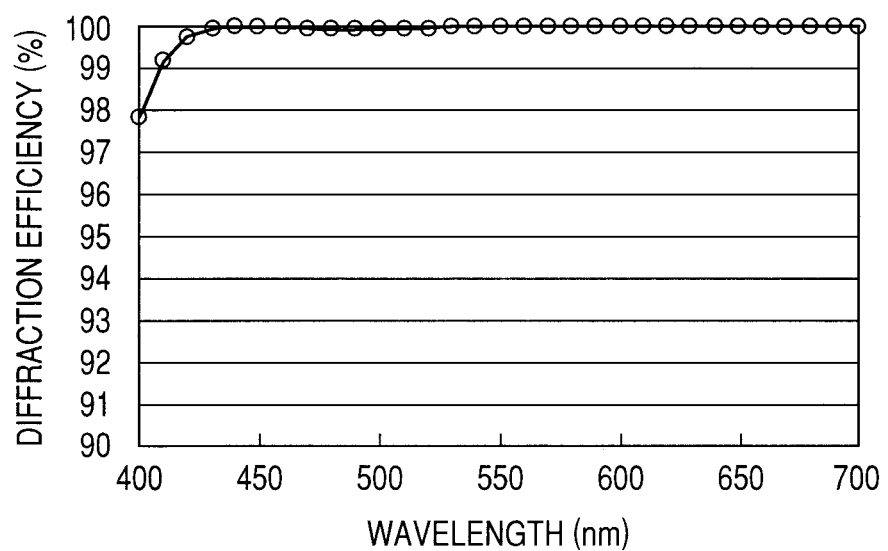
FIG. 14A is a graph of the diffraction efficiency of the diffractive optical element according to Embodiment 4 of the present invention.
Figure 14B:
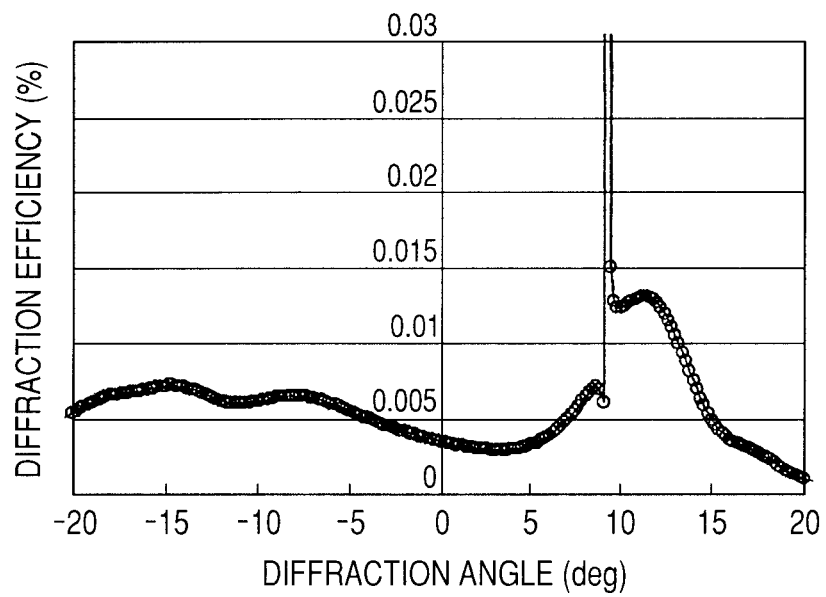
FIG. 14B is a graph of the diffraction efficiency of the diffractive optical element according to Embodiment 4 of the present invention.

Here, the first diffraction grating (M1B) 8 and the third material layer (M1A) 10 constitute the first combination part, and the first diffraction grating (M2B) 8 and the second diffraction grating (M2A) 9 constitute the second combination part. In addition, the grating thickness d1 of the diffraction grating 8 is 12.4 µm, the grating thickness d2 of the diffraction grating 9 is 3.75 µm, the interval D between the grating side surfaces 8d and 9d of the diffraction gratings 8 and 9 of the third material layer 10 is 1.5 µm, and the diffraction pitch P is 100 µm. The inclination of the grating side surfaces 8d and 9d of the diffraction gratings 8 and 9 with respect to the normal of the envelopment surface of the tips of the grating is set to 0 degrees. FIG. 14A shows a diffraction efficiency characteristic of the first order as the design order when the light beam enters the diffractive optical element 1 according to Embodiment 4 at a right angle to the normal of the envelopment surface 8c of the tips of grating. As can be seen from the characteristic diagram, very high diffraction efficiency is obtained in the diffractive optical element 1 in the entire visible range. In addition, FIG. 14B shows a calculation result of the RCWA calculation in the case where the light beam having a wavelength of 550 nm enters the diffractive optical element 1 according to Embodiment 4 at an angle (+10 degrees) deviated from the optimal incident angle. Here the angle of +10 degrees is the same as the light beam incident direction illustrated in FIG. 6. If the light beam enters the diffractive optical element 1 illustrated in FIG. 13 from the left side, it means that the light beam enters at an angle of 10 degrees from top of the diagram with respect to the normal of the envelopment surface 8c of the tip part of the grating. As can be seen from FIG. 14B, diffraction efficiency of the light reaching the image plane with the diffraction angle of 0 degrees and its vicinity is substantially low. Therefore, the diffractive optical element 1 having the structure of Embodiment 4 has the structure in which undesirable light generated when the light other than the light beam used for imaging enters is largely reduced.

Embodiment 5

Figure 15:
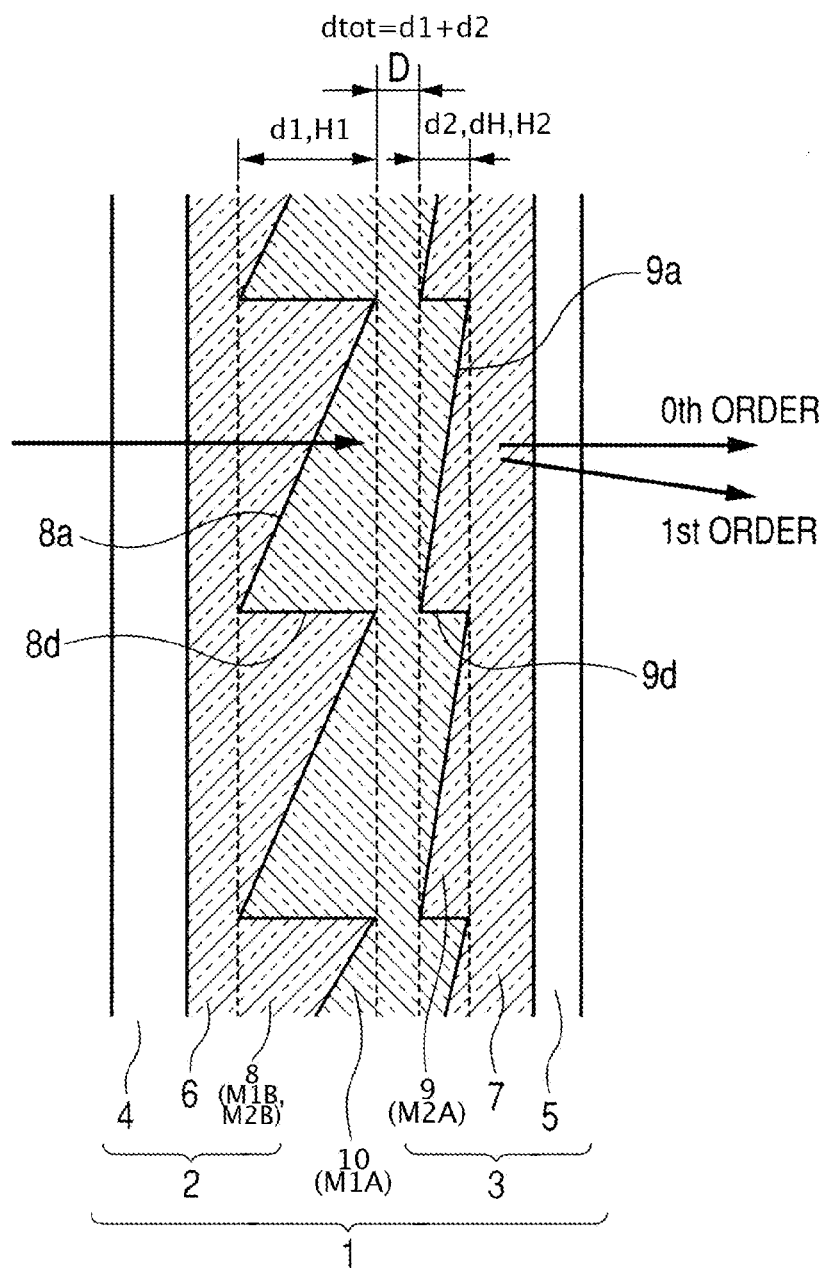
FIG. 15 is a partial cross sectional view of a diffractive optical element according to Embodiment 5 of the present invention.

In the embodiments described above, the diffraction grating made of the resin material totally is used for description. However, the effect of using the diffractive optical element of the present invention is not limited to this, and the same effect can be obtained by using a glass mold material, for example. FIG. 15 is a cross sectional view of a main part of the diffractive optical element according to Embodiment 5 of the present invention. In Embodiment 5, the diffractive optical element 1 has a structure similar to Embodiment 4, in which the third material layer (M1A) 10 is disposed between the first diffraction grating (M1B, M2B) 8 and the second diffraction grating (M2A) 9. Note that the third material layer (M1A) 10 is set to have a thickness D between edges formed by the grating surfaces 8a and 9a and the grating side surfaces 8d and 9d of the diffraction gratings 8 and 9. In the diffractive optical element 1 illustrated in FIG. 15, a resin (Nd=1.564, vd=20.8) in which ITO microparticles were mixed in an ultraviolet curing resin manufactured by DIC Corporation was used for the first diffraction grating (M1B, M2B) 8.

On the other hand, a glass mold material K-VC99 manufactured by SUMITA Optical Glass, Inc. (Nd=1.851, vd=41.6) was used for the second diffraction grating (M2A) 9. In addition, a resin (Nd=1.569, vd=47.9) in which ZrO$_2$ microparticles were mixed in an acrylic resin was used for the third material layer (M1A) 10. In addition, the grating thickness d1 of the diffraction grating 8 is 12.3 µm, the grating thickness d2 of the diffraction grating 9 is 1.88 µm, the interval D between grating side surfaces of the diffraction gratings 8 and 9 in the third material layer 10 is 1.5 µm, and the diffraction pitch P is 100 µm. The first diffraction grating (M1B) 8 and the third material layer (M1A) 10 correspond to the first combination part, and the first diffraction grating (M2B) 8 and the second diffraction grating (M2A) 9 correspond to the second combination part. The inclination of the grating side surfaces 8d and 9d of the diffraction gratings 8 and 9 with respect to the normal of the envelopment surface of the tips of the grating is set to 0 degrees.

Figure 16A:
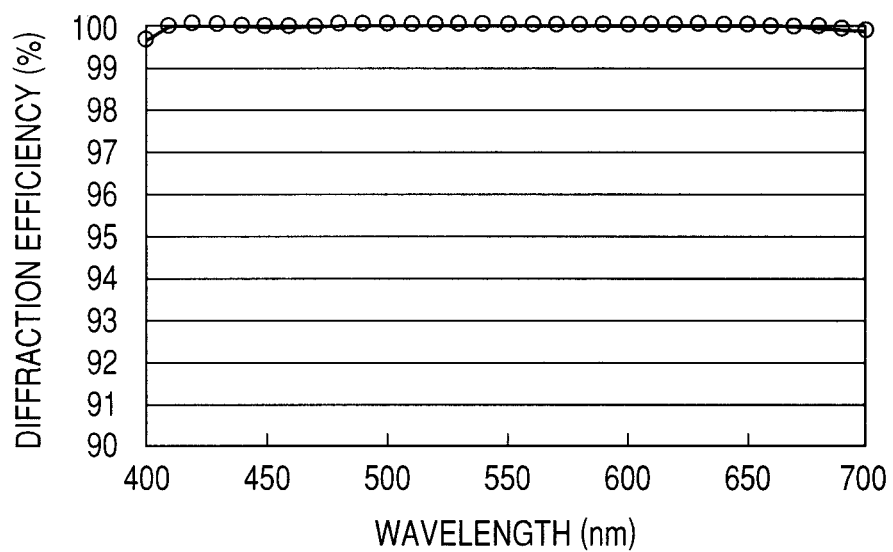
FIG. 16A is a graph of the diffraction efficiency of the diffractive optical element according to Embodiment 5 of the present invention.
Figure 16B:
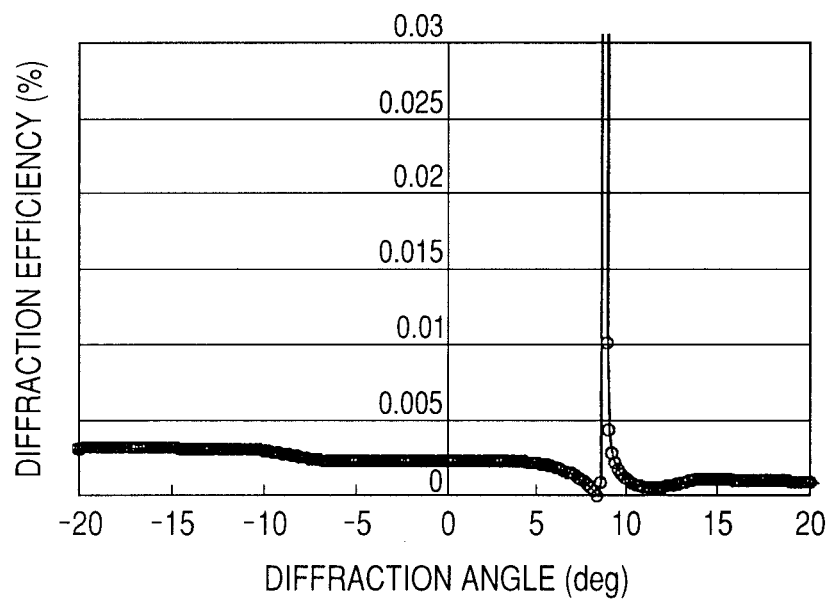
FIG. 16B is a graph of the diffraction efficiency of the diffractive optical element according to Embodiment 5 of the present invention.

In Embodiment 5, the refractive index difference in the second material combination can be increased by using the glass mold material. As a result, the grating thickness of the second diffraction grating 9 can be decreased down to 2 µm or smaller. FIG. 16A shows a diffraction efficiency characteristic of the first order as the design order when light beam enters the diffractive optical element 1 according to Embodiment 5 at a right angle to the normal of the envelopment surface of the tips of the grating. As can be seen from these characteristic graphs, very high diffraction efficiency can be obtained in the diffractive optical element 1 in the entire visible range. In addition, FIG. 16B shows a calculation result of the RCWA calculation when the light beam having a wavelength of 550 nm enters the diffraction grating of Embodiment 5 at an angle (+10 degrees) deviated from the optimal incident angle. Here, +10 degrees is the same as the light beam incident direction illustrated in FIG. 6. If the light beam enters the diffractive optical element illustrated in FIG. 15 from the left side, it means that the light beam enters at an angle of 10 degrees from top of the diagram with respect to the normal of the envelopment surface of the tip part of the grating. As can be seen from FIG. 16B, diffraction efficiency of the light reaching the image plane with the diffraction angle of 0 degrees and its vicinity is substantially low. Therefore, the diffractive optical element having the structure of Embodiment 5 has the structure in which undesirable light generated when the light other than the light beam used for imaging enters is largely reduced.

Embodiment 6

Figure 17:
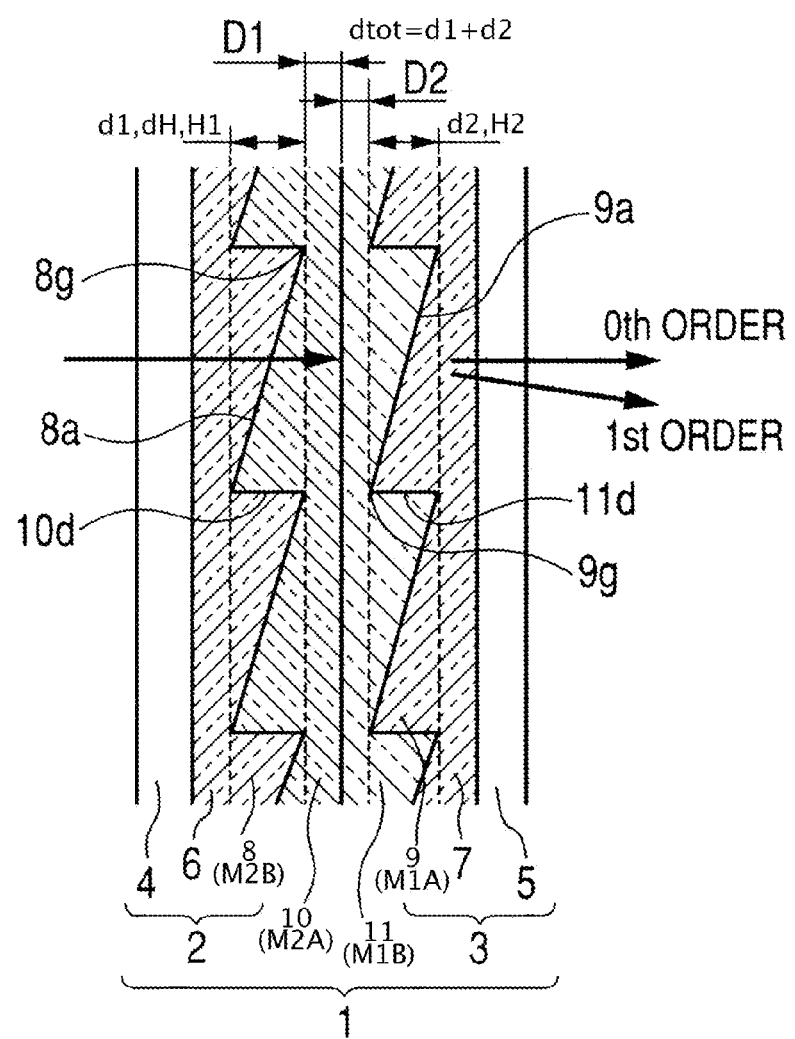
FIG. 17 is a partial cross sectional view of a diffractive optical element according to Embodiment 6 of the present invention.

FIG. 17 is a cross sectional view of a main part of the diffractive optical element according to Embodiment of the present invention. In Embodiment 6, the diffractive optical element 1 has a structure in which the third material layer 10 (M2A) is cemented in intimate contact to the diffraction grating (M2B) 8 made of a first material. Then, the fourth material layer (M1B) 11 is cemented in intimate contact to the diffraction grating (M1A) 9 made of a second material, and the third material layer 10 and the fourth material layer 11 are cemented in intimate contact via a flat surface. Note that the third material layer 10 is set to have a thickness D1 between edges of a grating peak part 8g of the grating surface 8a of the diffraction grating 8 and the fourth material layer 11. Similarly, the fourth material layer (M1B) 11 is set to have a thickness D2 between edges of a grating peak part 9g of the grating surface 9a of the diffraction grating (MLA) 9 and the third material layer 10 (M2A). In the diffractive optical element 1 illustrated in FIG. 17, a resin (Nd=1.518, vd=30.1) in which ITO microparticles were mixed in PMMA was used for the first diffraction grating 8.

On the other hand, a glass mold material K-GFK68 manufactured by SUMITA Optical Glass, Inc. (Nd=1.592, vd=68.3) was used for the third material layer 10. In addition, a resin (Nd=1.569, vd=47.9) in which $ZrO_2$ microparticles were mixed in an acrylic resin was used for the second diffraction grating 9. On the other hand, a resin (Nd=1.564, vd=20.8) in which ITO microparticles were mixed in an ultraviolet curing resin manufactured by DIC Corporation was used for the fourth material layer 11. In addition, the grating thickness d1 of the diffraction grating 8 is 7.48 μm, and the grating thickness d2 of the diffraction grating 9 is 6.5 μm. The interval D1 in the third material layer 10 between the boundary and the grating side surface 10d is 1.0 μm, the interval D2 in the fourth material layer 11 between the boundary part and a grating side surface 11d is 1.0 μm, and the diffraction pitch P is 100 μm. The inclination of the grating side surfaces of the diffraction grating 8 and the diffraction grating 9 with respect to the normal of the envelopment surface of the tips of the grating is set to 0 degrees.

Figure 18:
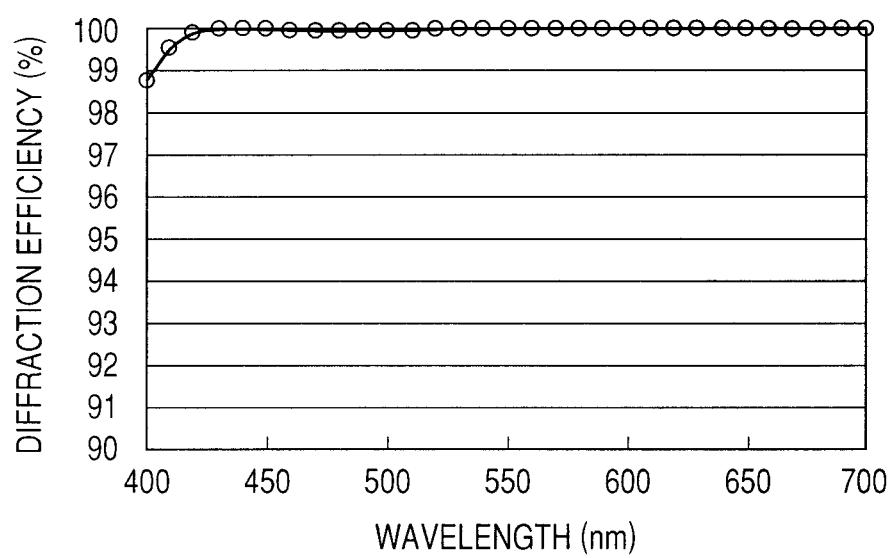
FIG. 18 is a graph of the diffraction efficiency of the diffractive optical element according to Embodiment 6 of the present invention.

The second diffraction grating (M1A) 9 and the fourth material (M1B) 11 correspond to the first combination part, and the first diffraction grating (M2B) 8 and the third material (M2A) 10 correspond to the second combination part. FIG. 18 shows a diffraction efficiency characteristic of the first order as the design order when the light beam enters the diffractive optical element 1 according to Embodiment 6 at a right angle to the normal of the envelopment surface of the tips of the grating. As can be seen from the characteristic graph, very high diffraction efficiency is obtained in the diffractive optical element 1 in the entire visible range. In addition, also in Embodiment 6, the grating thickness of the first diffraction grating 8 can be reduced because a combination of materials having a small refractive index difference and a large dispersion difference is used between the second diffraction grating 9 and the fourth material layer 11. Therefore, flare generated from the grating side surface can be reduced.

Embodiment 7

Figure 19:
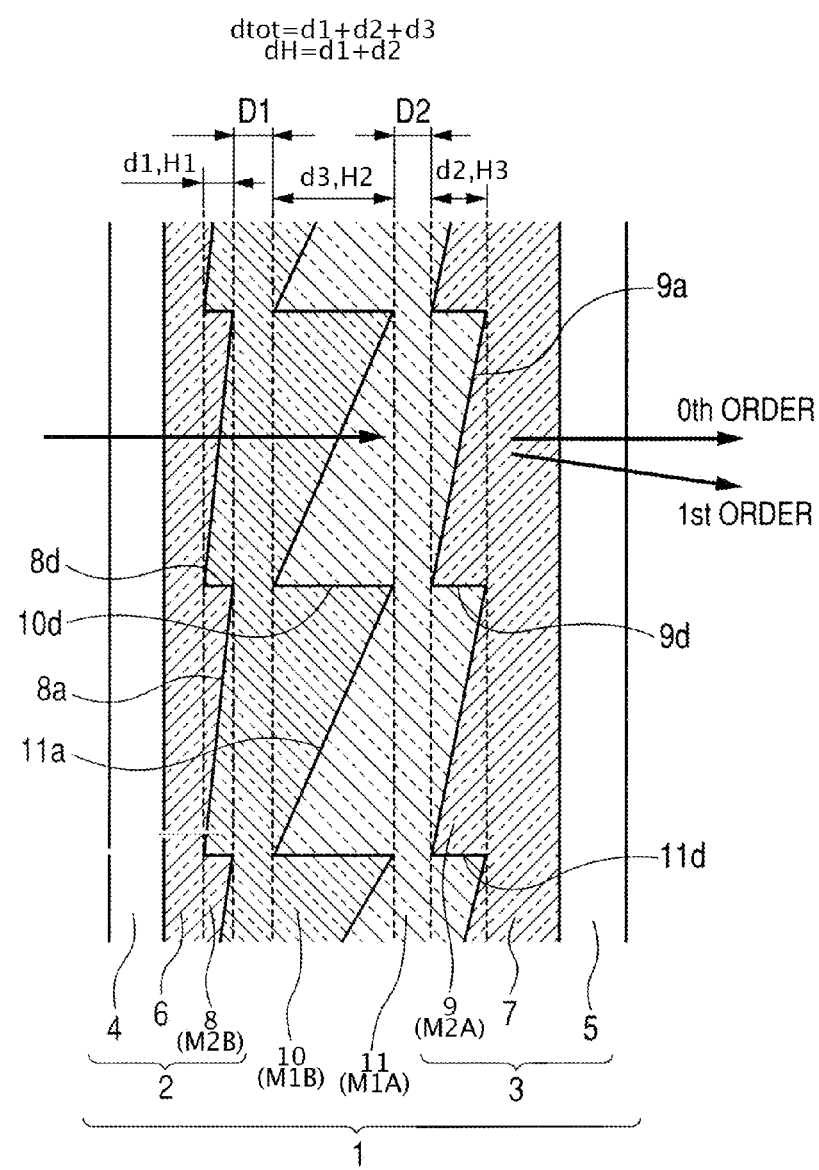
FIG. 19 is a partial cross sectional view of a diffractive optical element according to Embodiment 7 of the present invention.

In Embodiment 6 described above, the third material layer 10 and the fourth material layer 11 are in intimate contact via the flat surface thereof, but the diffractive optical element of the present invention is not limited to this structure. FIG. 19 is a cross sectional view of a main part of the diffractive optical element according to Embodiment 7. In Embodiment 7, the diffractive optical element 1 has a structure in which the third material layer (M1B) 10 is cemented in intimate contact to the diffraction grating (M2B) 8 made of the first material, and the fourth material layer (M1A) 11 is cemented in intimate contact to the diffraction grating (M2A) 9 made of the second material. Further, the diffraction grating 10 including the third material layer and the diffraction grating 11 including the fourth material layer are cemented in intimate contact via a diffraction grating surface 11a. Note that the third material layer (M1B) 10 is set to have a thickness D1 between edges formed by the diffraction grating surface 8a and the grating side surface 8d and edges formed by the diffraction grating surface 11a and the grating side surface 10d.

In the same manner, the fourth material layer (M1A) 11 is set to have a thickness D2 between edges formed by the diffraction grating surface 9a and the grating side surface 9d and edges formed by the diffraction grating surface 11a and the grating side surface 10d. In the diffractive optical element 1 illustrated in FIG. 19, a resin (Nd=1.453, vd=33.2) in which ITO microparticles were mixed in a fluorinated resin was used for the first diffraction grating (M2B) 8. On the other hand, a resin (Nd=1.555, vd=19.7) in which ITO microparticles were mixed in PMMA was used for the third material layer 10 (M1B). In addition, a resin (Nd=1.640, vd=56.5) in which $Y_2O_3$ microparticles were mixed in a resin ZEONEX-E48R manufactured by Zeon Corporation was used for the second diffraction grating (M2A) 9. On the other hand, a resin (Nd=1.561, vd=48.3) in which $ZrO_2$ microparticles were mixed in an acrylic resin was used for the fourth material layer 11. The fourth material layer (M1A) 11 and the third material layer (M1B) 10 correspond to the first combination part, and the second diffraction grating (M2A) 9 and the first diffraction grating (M2B) 8 correspond to the second combination part. The grating thickness d1 of the diffraction grating 8 is 1.5 μm, the grating thickness d2 of the diffraction grating 9 is 4.58 μm, and the grating thickness d3 of the diffraction grating surface 12 is 11.5 μm.

Figure 20:
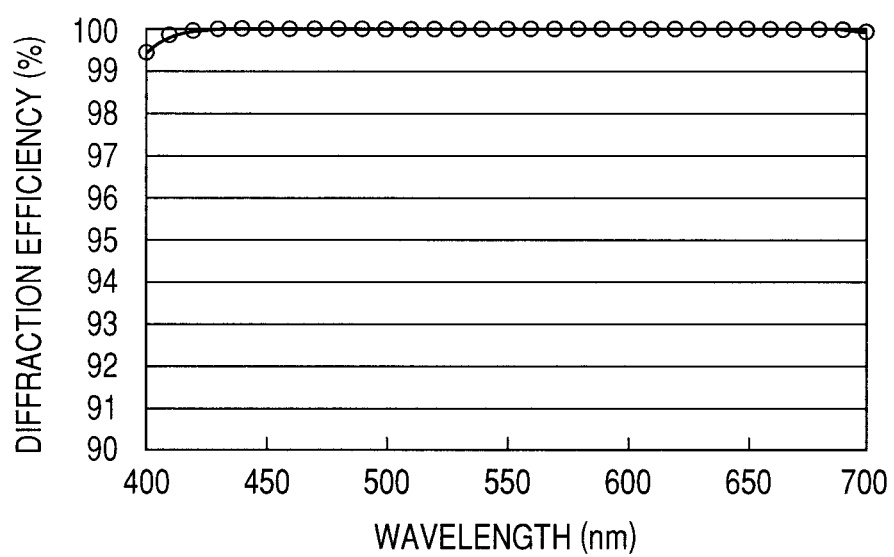
FIG. 20 is a graph of the diffraction efficiency of the diffractive optical element according to Embodiment 7 of the present invention.

In addition, the interval D1 in the third material layer 10 between the edges formed by the diffraction grating surface 8a and the grating side surface 8d and the edges formed by the diffraction grating surface 11a and the grating side surface 10d is 1.0 μm, and the interval D2 in the fourth material layer 11 between the edges formed by the diffraction grating surface 9a and the grating side surface 9d and the edges formed by the diffraction grating surface 11a and the grating side surface 10d is 1.0 μm. The diffraction pitch P is 100 μm. The inclination of the grating side surfaces 8d, 9d, and 11d of the diffraction grating 8, the diffraction grating 9, and the grating surface 11a with respect to the normal of the envelopment surface of the tips of the grating is set to 0 degrees. FIG. 20 shows diffraction efficiency characteristic of the first order as the design order when the light beam enters the diffractive optical element 1 according to Embodiment 7 at a right angle to the normal of the envelopment surface of the tips of the grating. As can be seen from the characteristic graph, very high diffraction efficiency is obtained in the diffractive optical element 1 in the entire visible range. In addition, also in Embodiment 7, the grating thicknesses of the first diffraction grating 8 and the second diffraction grating 9 can be reduced because a combination of materials having a small refractive index difference and a large dispersion difference is used between the third material layer 10 and the fourth material layer 11 constituting the diffraction grating surface 11a.

Embodiment 8

Figure 21:
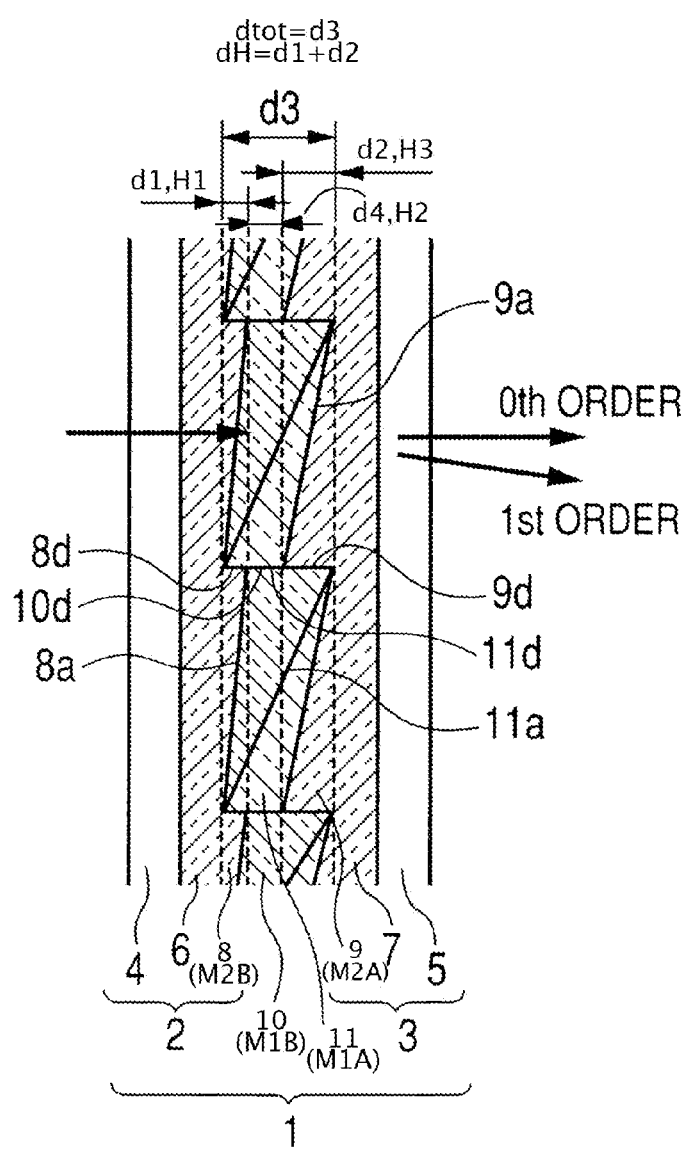
FIG. 21 is a partial cross sectional view of a diffractive optical element according to Embodiment 8 of the present invention.

FIG. 21 is a cross sectional view of a main part of a diffractive optical element according to Embodiment 8 of the present invention. In the structure illustrated in FIG. 21, the same materials and the shape as Embodiment 7 illustrated in FIG. 19 are used to form the diffraction grating (M2B) 8 made of the first material, the diffraction grating (M2A) 9 made of the second material, and the diffraction grating surface 11a. Further, the materials forming the third material layer (M1B) 10 and the fourth material layer (M1A) 11 are also the same as those in Embodiment 7. The diffraction grating 11 and the diffraction grating 10 correspond to the first combination part, while the diffraction grating 9 and the diffraction grating 8 correspond to the second combination part. In Embodiment 7, edge parts of the diffraction gratings 8 and are disposed with the thicknesses of D1 and D2, respectively, with respect to the edge part of the diffraction grating surface 11a. In contrast, in Embodiment 8, the grating surface 8a and the grating surface 9a are disposed to be close to the diffraction grating surface 11a so that edge parts thereof are adjacent to each other.

As a result, the grating side surface 8d of the diffraction grating (M2B) 8 and the grating side surface 9d of the diffraction grating (M2A) 9 are disposed to be close to the grating side surface of the diffraction grating surface 11a in the grating pitch direction. Further, the grating side surface 10d including the third material layer (M1B) 10 and the grating side surface 11d including the fourth material layer (M1A) 11 are disposed to be close to each other in the grating pitch direction. In this case, the grating thicknesses having a large refractive index difference between the materials of the grating side surfaces are d1 and d2, which are the same as in Embodiment 7. However, the grating thickness having a small refractive index difference between materials of the grating side surfaces is 5.42 µm in Embodiment 8, which is substantially small compared with that of 11.5 µm in Embodiment 7 which is equal to the height of the grating side surface of the diffraction grating surface 11a. From this respect, the diffractive optical element according to Embodiment 8 has a structure in which occurrence of undesirable light is largely reduced when light other than the light beam used for imaging enters. Note that, Table 3 shows the combination satisfying the highest value of the expression (3) if multiple combinations exist which satisfy the conditional expressions (3), (4), and (5) concerning the second combination part. Each table shows the combination satisfying the smallest value of the expressions (9) and (10), respectively, if multiple combinations exist which satisfy the conditional expressions (9) and (10).

Embodiment 9

Figure 22:
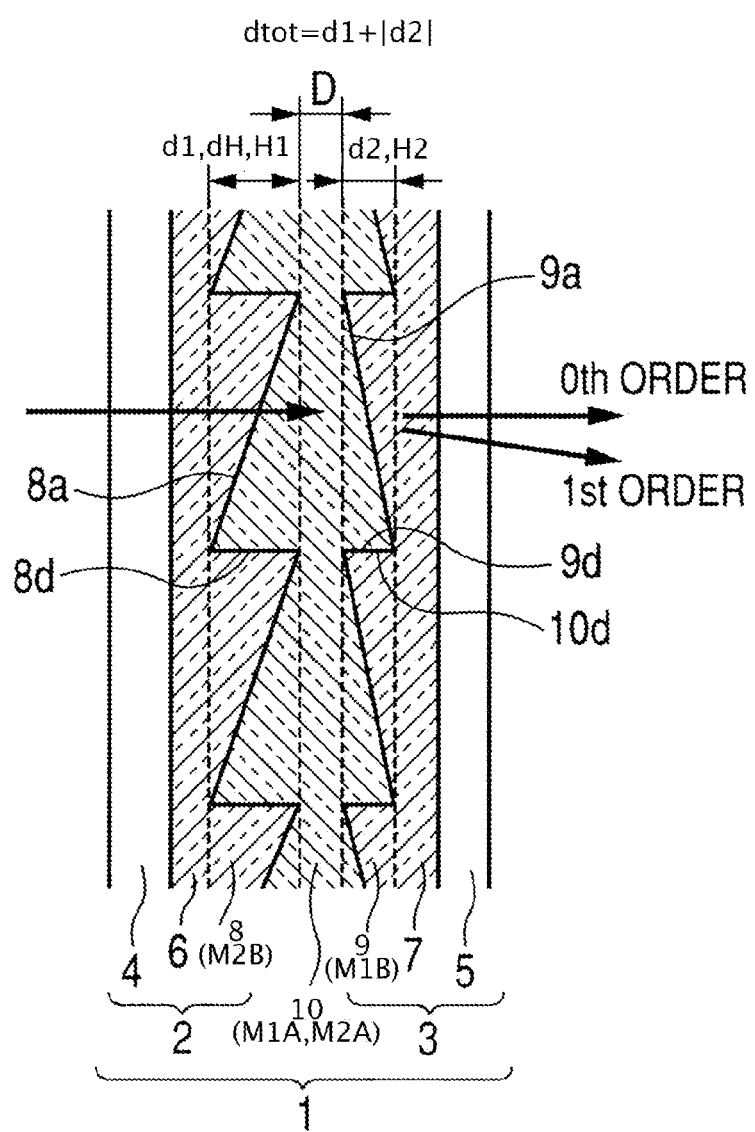
FIG. 22 is a partial cross sectional view of a diffractive optical element according to Embodiment 9 of the present invention.

In Embodiments 1 to 8, directions of multiple diffraction grating surfaces are all the same, but the diffraction grating of the present invention is not limited to this structure. FIG. 22 is a cross sectional view of a main part of a diffractive optical element according to Embodiment 9 of the present invention. In Embodiment 9, similarly to Embodiment 1, the third material layer (M1A, M2A) 10 is disposed between the first diffraction grating (M2B) 8 and the second diffraction grating (M1B) 9. The diffraction grating 9 and the diffraction grating 10 correspond to the first combination part, while the diffraction grating 10 and the diffraction grating 8 correspond to the second combination part. However, the grating surface 8a of the first diffraction grating (M2B) 8 has a structure in which the grating thickness increases from the bottom to the top in FIG. 22, while the grating surface 9a of the second diffraction grating (M1B) 9 has a structure in which the grating thickness decreases from the bottom to the top in FIG. 22. Note that, the third material layer (M1A, M2A) 10 is set to have a thickness D between edges of the grating surfaces 8a and 9a and the grating side surfaces 8d and 9d of the diffraction gratings 8 and 9.

Figure 23:
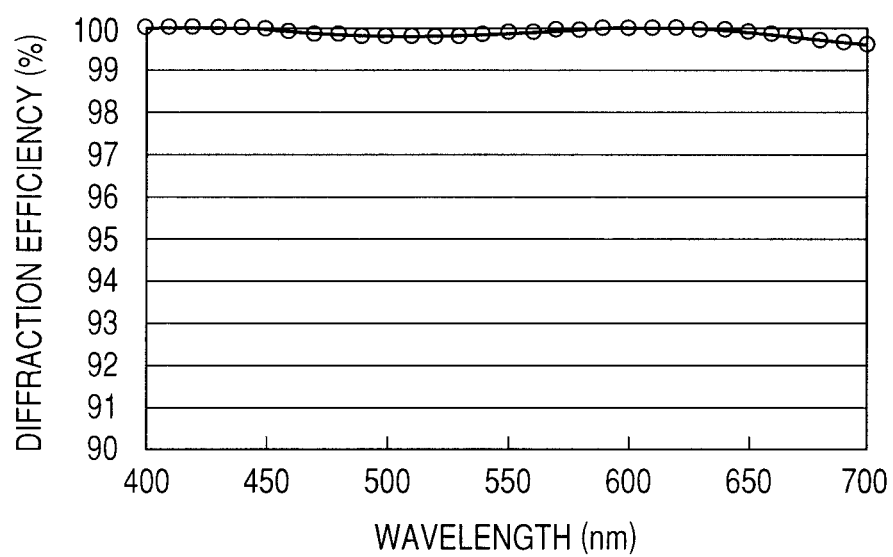
FIG. 23 is a graph of the diffraction efficiency of the diffractive optical element according to Embodiment 9 of the present invention.

In the diffractive optical element 1 illustrated in FIG. 22, a resin (Nd=1.480, vd=21.7) in which ITO microparticles were mixed in a fluorinated resin was used for the first diffraction grating (M2B) 8. On the other hand, a resin (Nd=1.558, vd=28.2) in which TiO$_2$ microparticles were mixed in PMMA was used for the second diffraction grating (M1B) 9. In addition, a resin (Nd=1.559, vd=60.2) in which Al$_2$O$_3$ microparticles were mixed in PMMA was used for the third material layer (M1A, M2A) 10. In addition, the grating thickness d1 of the diffraction grating 8 is 7.45 µm, the grating thickness d2 of the diffraction grating 9 is 4.6 µm, the interval D between the grating side surfaces 8d and 9d of the diffraction gratings 8 and 9 of the third material layer 10 is 1.5 µm, and the diffraction pitch P is 100 µm. The inclination of the grating side surfaces 8d and 9d of the diffraction gratings 8 and 9 with respect to the normal of the envelopment surface of the tips of the grating is set to 0 degrees. FIG. 23 shows diffraction efficiency characteristic of the first order as the design order when the light beam enters the diffractive optical element 1 according to Embodiment 9 at a right angle to the normal of the envelopment surface of the tips of the grating. As can be seen from the characteristic graph, very high diffraction efficiency is obtained in the diffractive optical element 1 in the entire visible range. In addition, also in Embodiment 9, the combination of materials having a small refractive index difference and a large dispersion difference is used between the second diffraction grating 9 and the third material layer. Therefore, the grating thickness of the first diffraction grating 8 can be reduced. Therefore, flare to be generated from the grating side surface can be reduced.

Tables 1 to 4 below show values of the diffractive optical elements of the individual embodiments, which correspond to the individual conditional expressions. In addition, association of diffraction grating with the resins M1A, M1B, M2A, and M2B is also shown. Table 5 shows the grating thickness dtot concerning the conditional expression (6).

TABLE 1

|  | Embodiment 1 | Embodiment 2 | Embodiment 3 |
|---|---|---|---|
| M1A (Nd/vd) | 1.569/47.9 | 1.569/47.9 | 1.569/47.9 |
| M1B (Nd/vd) | 1.564/20.8 | 1.564/20.8 | 1.564/20.8 |
| M2A (Nd/vd) | 1.569/47.9 | 1.569/47.9 | 1.569/47.9 |
| M2B (Nd/vd) | 1.480/21.7 | 1.480/21.7 | 1.480/21.7 |
| w satisfying equation (1) (nm) | 536.1 | 536.1 | 536.1 |
| Equation (2) | 27.1 | 27.1 | 27.1 |
| Equation (3) | 0.089 | 0.089 | 0.089 |
| Equation (4) | 26.2 | 26.2 | 26.23 |
| Equation (5) | 2.33 | 2.33 | 2.33 |
| Equation (6) | 19.9 µm | 13.7 µm | 13.7 µm |
| Equation (7) | 0.31 | 0.45 | 0.45 |
| Equation (8) | 6.2 µm | 6.2 µm | 6.2 µm |
| Equation (9·10) | 0.9 | 0.9 | 0.9 |
| Equation (11) hereinafter | | | |
| j = 1 (Nd1/Nd2) | 1.480/1.564 | 1.480/1.569 | 1.564/1.569 |
| θ1 (rad) | 1.241 | 1.233 | 1.495 |
| H1 | 6.2 µm | 6.2 µm | 7.5 µm |
| j = 2 (Nd1/Nd2) | 1.564/1.569 | 1.564/1.569 | 1.480/1.569 |
| θ2 (rad) | 1.495 | 1.495 | 1.233 |
| H2 | 13.7 µm | 7.5 µm | 6.2 µm |
| Equation (11) | 3.08 | 2.67 | 2.67 |

TABLE 2

|  | Embodiment 4 | Embodiment 5 |
|---|---|---|
| M1A (Nd/vd) | 1.481/72.9 | 1.569/47.9 |
| M1B (Nd/vd) | 1.480/21.7 | 1.564/20.8 |
| M2A (Nd/vd) | 1.634/60.2 | 1.851/41.6 |
| M2B (Nd/vd) | 1.480/21.7 | 1.564/20.8 |
| w satisfying equation (1) (nm) | 577.9 | 536.1 |
| Equation (2) | 51.3 | 27.1 |
| Equation (3) | 0.154 | 0.287 |
| Equation (4) | 38.5 | 20.8 |
| Equation (5) | 5.94 | 6.0 |
| Equation (6) | 16.15 µm | 14.18 µm |
| Equation (7) | 0.23 | 0.1 |
| Equation (8) | 3.75 µm | 1.88 µm |
| Equation (9·10) | 12.8 | 6.3 |
| Equation (11) hereinafter | | |
| j = 1 (Nd1/Nd2) | 1.480/1.481 | 1.564/1.569 |
| θ1 (rad) | 1.536 | 1.495 |
| H1 | 12.4 µm | 12.3 µm |
| j = 2 (Nd1/Nd2) | 1.481/1.634 | 1.569/1.851 |
| θ2 (rad) | 1.134 | 1.012 |
| H2 | 3.75 µm | 1.88 µm |
| Equation (11) | 2.07 | 1.99 |

TABLE 3

|  | Embodiment 6 | Embodiment 7 | Embodiment 8 |
| --- | --- | --- | --- |
| M1A (Nd/vd) | 1.569/47.9 | 1.561/48.3 | 1.561/48.3 |
| M1B (Nd/vd) | 1.564/20.8 | 1.555/19.7 | 1.555/19.7 |
| M2A (Nd/vd) | 1.592/68.3 | 1.640/56.5 | 1.640/56.5 |
| M2B (Nd/vd) | 1.518/30.1 | 1.453/33.2 | 1.453/33.2 |
| w satisfying equation (1) (nm) | 536.1 | 524.6 | 524.6 |
| Equation (2) | 27.1 | 28.6 | 28.6 |
| Equation (3) | 0.075 | 0.187 | 0.187 |
| Equation (4) | 38.2 | 23.4 | 23.4 |
| Equation (5) | 2.85 | 4.37 | 4.37 |
| Equation (6) | 13.98 μm | 17.58 μm | 11.5 μm |
| Equation (7) | 0.54 | 0.35 | 0.53 |
| Equation (8) | 7.48 μm | 6.08 μm | 6.08 μm |
| Equation (9·10) | 9.3 | 8.2 | 8.2 |
| Equation (11) hereinafter | | | |
| j = 1 (Nd1/Nd2) | 1.518/1.592 | 1.453/1.555 | 1.453/1.561 |
| θ1(rad) | 1.263 | 1.207 | 1.197 |
| H1 | 7.48 μm | 1.5 μm | 1.5 μm |
| j = 2 (Nd1/Nd2) | 1.564/1.569 | 1.555/1.561 | 1.555/1.561 |
| θ2(rad) | 1.495 | 1.484 | 1.484 |
| H2 | 6.5 μm | 11.5 μm | 5.42 μm |
| j = 3 (Nd1/Nd2) | — | 1.561/1.640 | 1.555/1.640 |
| θ3(rad) | — | 1.258 | 1.247 |
| H3 | — | 4.58 μm | 4.58 μm |
| Equation (11) | 2.79 | 2.97 | 2.51 |

TABLE 4

|  | Embodiment 9 |
| --- | --- |
| M1A (Nd/vd) | 1.559/60.2 |
| M1B (Nd/vd) | 1.558/28.2 |
| M2A (Nd/vd) | 1.559/60.2 |
| M2B (Nd/vd) | 1.480/21.7 |
| w satisfying equation (1) (nm) | 577.2 |
| Equation (2) | 32.0 |
| Equation (3) | 0.079 |
| Equation (4) | 38.5 |
| Equation (5) | 3.05 |
| Equation (6) | 12.05 μm |
| Equation (7) | 0.62 |
| Equation (8) | 7.45 μm |
| Equation (9·10) | 6.6 |
| Equation (11) hereinafter | |
| j = 1 (Nd1/Nd2) | 1.480/1.559 |
| θ1 (rad) | 1.251 |
| H1 | 7.45 μm |
| j = 2 (Nd1/Nd2) | 1.558/1.559 |
| θ2(rad) | 1.546 |
| H2 | 4.6 μm |
| Equation (11) | 2.50 |

TABLE 5

Grating thickness dtot of conditional expression (6)

| Embodiment | dtot |
| --- | --- |
| 1, 4, 5, 6, 9 | d1 + |d2| |
| 2 | d1 + d3 = d2 |
| 3 | d1 + d3 = d2 |
| 7 | d1 + d2 + d3 |
| 8 | d3 |

Figure 24A:
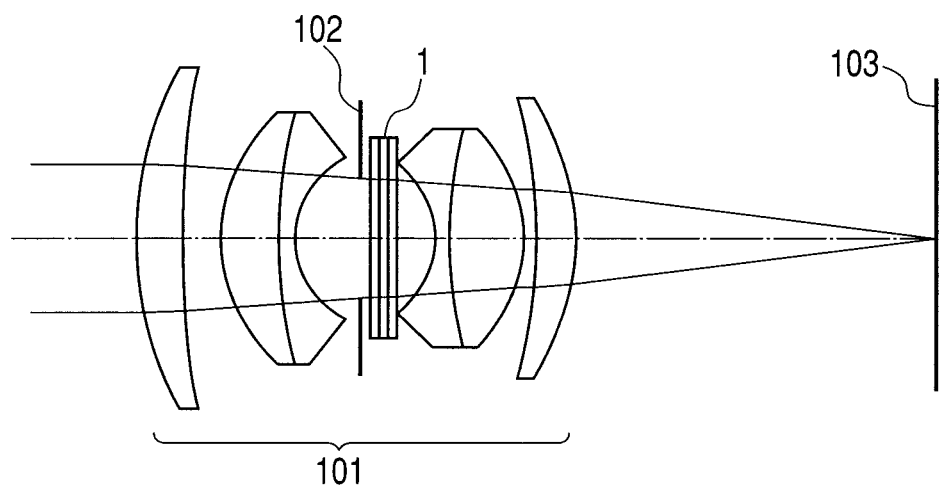
FIG. 24A is a structural view of an image taking optical system using the diffractive optical element of the present invention.

FIG. 24A is a cross sectional view of a main part of an image taking (imaging) optical system of a camera (such as a still camera or a video camera) using the diffractive optical element of the present invention. In FIG. 24A, an imaging lens 101 is constituted by a refraction optical element (e.g., general lens element) mostly and includes inside an aperture stop 102 and the diffractive optical element 1 described in the embodiments. An imaging medium 103 such as a film or a CCD is disposed on the imaging plane. The diffractive optical element 1 is an element having a lens function, which corrects chromatic aberration generated in the refraction optical element of the imaging lens 101. Then, the diffractive optical element 1 can realize an image taking optical system with little flare light, high resolution at low frequency, and high optical performance, because undesirable light is substantially reduced compared with the conventional optical element. Further, the diffractive optical element is provided on the flat glass surface disposed in the vicinity of the aperture stop 102 in this embodiment, but this embodiment is not limited to this. The diffractive optical element 1 may be provided on a concave surface or a convex surface of a lens. Further, multiple diffractive optical elements 1 may be disposed in the imaging lens 101.

Figure 24B:
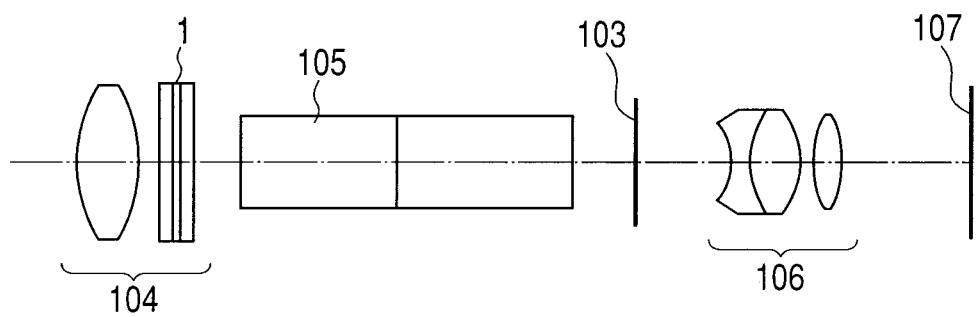
FIG. 24B is a structural view of an observation optical system using the diffractive optical element of the present invention.

FIG. 24B is a cross sectional view of a main part of an observation optical system of a binocular using the diffractive optical element of the present invention. In FIG. 24B, the observation optical system includes an objective lens 104, a prism 105 for converting an inverted image into an erect image, an eyepiece lens 106, and an evaluation plane (pupil surface) 107. The diffractive optical element 1 is one that is described in each embodiment and is disposed for a purpose to correct chromatic aberration or the like on the imaging plane 103 of the objective lens 104. This observation optical system has a largely improved diffraction efficiency characteristic compared with the conventional system as described above in each embodiment, and hence has little flare light, high resolution at low frequency, and high optical performance. Note that, the case where the diffractive optical element 1 is disposed on the flat glass surface is described in this embodiment, but this embodiment is not limited to this structure. The diffractive optical element 1 may be disposed on a concave surface or a convex surface of a lens. Further, multiple diffractive optical elements 1 may be disposed in the observation optical system. In addition, the case where the diffractive optical element 1 is disposed in the objective lens part is described in this embodiment, but without limiting to this structure, the diffractive optical element 1 may be disposed on the surface of the prism 105 or at a position inside the eyepiece lens 106. In this case, too, the same effect as described above can be obtained. However, if the diffractive optical element 1 is disposed closer to the object side with respect to the imaging plane 103, the effect of reducing chromatic aberration can be obtained only by the objective lens part. Therefore, in the case of a naked eye observation system, it is desirable to dispose the diffractive optical element 1 at least in the objective lens part. In addition, the observation optical system of a binocular is described in this embodiment, but the diffractive optical element of the present invention can also be applied to other observation optical systems such as a terrestrial telescope or an astronomical telescope. Further, the present invention can also be applied to an optical type finder of a lens shutter camera or a video camera, to obtain the same effect as described above.

Figure 25:
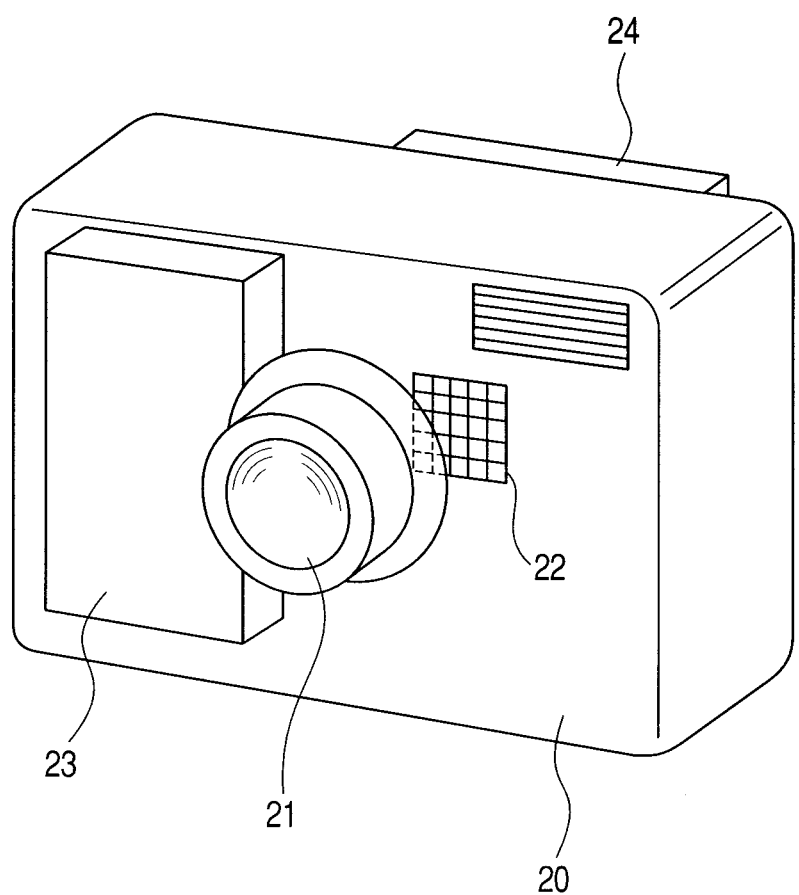
FIG. 25 is a schematic view of a main part of an image pickup apparatus according to the present invention.

FIG. 25 is a cross sectional view of a main part of a digital still camera (image pickup apparatus) in which the optical system including the diffractive optical element of the present invention is used as an image taking optical system. A solid-state image pickup element 22 (photoelectric conversion element) is a CCD sensor or a CMOS sensor or the like for receiving a subject image formed by an image taking optical system 21, and is incorporated in a camera main body. A memory 23 stores information corresponding to the subject image obtained by photoelectric conversion in the image pickup element 22. A finder 24 includes a liquid crystal display panel or the like for observing the subject image formed on the solid-state image pickup element 22. In this way, by applying the optical system of the present invention to the image pickup element of the digital still camera or the like, the image pickup apparatus with little flare, sufficient transparency, and high optical performance can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-264956, filed on Nov. 20, 2009, which is hereby incorporated by reference herein in its entirety.

What is claimed is:

1. A diffractive optical element comprising:
multiple diffraction gratings that are laminated,
wherein the multiple diffraction gratings include:
a first combination defined by a combination of two diffraction gratings, among the multiple diffraction gratings, with grating side surfaces thereof contacting each other or disposed close to each other in a grating pitch direction; and
a second combination defined by a combination of two diffraction gratings, among the multiple diffraction gratings,
wherein at least one of the two diffraction gratings of the second combination is made of a material that is different from the materials of the two diffraction gratings of the first combination,
wherein the following equation and conditional expressions are satisfied for a wavelength w (nm) in a range of 370 (nm)<w<730 (nm):

$N1Aw - N1Bw = 0;$ $16 < (v1A - v1B) < 75;$ $0.03 < |N2Ad - N2Bd| < 0.5;$ and $16 < (v2A - v2B) < 75,$ where N1Aw and N1Bw respectively denote refractive indices of the two diffraction gratings of the first combination at the wavelength w, v1A and v1B respectively denote Abbe numbers of the two diffraction gratings of the first combination, N2Ad and N2Bd respectively denote refractive indices of the two diffraction gratings of the second combination for a d-line, and v2A and v2B respectively denote Abbe numbers of the two diffraction gratings of the second combination.

2. The diffractive optical element according to claim 1, wherein the two diffraction gratings of the second combination satisfy the following conditional expression:

$1.3 < (N2Ad - N2Bd) \times (v2A - v2B) < 35.$

3. The diffractive optical element according to claim 1, wherein the following conditional expression is satisfied:

$dtot < 30 (\mu m),$ where dtot denotes a grating thickness of the multiple diffraction gratings.

4. The diffractive optical element according to claim 1, wherein the following conditional expression is satisfied:

$0.1 < dH/dtot < 0.7,$ where grating side surfaces of two different gratings, among the multiple diffraction gratings, whose refractive index difference between the first two diffraction gratings is 0.03 or larger for a d-line, dH denotes a sum of heights regions where the grating side surfaces of the two diffraction gratings contact each other or are disposed close to each other in the grating pitch direction, and dtot denotes a sum of grating thickness of the multiple diffraction gratings.

5. The diffractive optical element according to claim 1, wherein the following conditional expression is satisfied:

$dH < 9 (\mu m),$ where grating side surfaces of two different gratings, among the multiple diffraction gratings, whose refractive index difference between the first two diffraction gratings is 0.03 or larger for a d-line, dH denotes a sum of heights of regions where the grating side surfaces of the two diffraction gratings contact each other or are disposed close to each other in the grating pitch direction.

6. The diffractive optical element according to claim 1, wherein the Abbe numbers v1A and v1B, and the Abbe numbers v2A and v2B satisfy at least one of the following conditional expressions:

$0 < |v1A - v2A| < 15;$ or $0 < |v1B - v2B| < 15.$

7. The diffractive optical element according to claim 1, wherein one of the two diffraction gratings of the second combination is identical to one of the two diffraction gratings of the first combination.

8. The diffractive optical element according to claim 1, wherein:
the multiple diffraction gratings comprise at least three diffraction gratings made of materials different from each other, and
grating side surfaces of at least two diffraction gratings contact with or are disposed close to a grating side surface of one diffraction grating among the at least three diffraction gratings in the grating pitch direction.

9. The diffractive optical element according to claim 1, wherein the following conditional expression is satisfied:

$$\frac{\left[ \sum_{j=1}^{n} \{ (\frac{\pi}{2} - \theta_j) \times H_j \} \right]}{m} < 3.5,$$

where j (j=1, 2, ... n) denotes respective regions of grating wall surfaces of the multiple diffraction gratings where the grating wall surfaces contact each other or are disposed close to each other in a grating pitch direction, θj (rad) denotes a critical angle on the d-line between the diffraction gratings facing each other, Hj (μm) denotes a height of the region j, and m denotes a designated diffraction order.

10. An optical system comprising:
a diffractive optical element comprising:
multiple diffraction gratings that are laminated,
wherein the multiple diffraction gratings include:
a first combination defined by a combination of two diffraction gratings, among the multiple diffraction gratings, with grating side surfaces thereof contacting each other or disposed close to each other in a grating pitch direction; and a second combination defined by a combination of two diffraction gratings, among the multiple diffraction gratings, wherein at least one of the two diffraction gratings of the second combination is made of a material that is different from the materials of the two diffraction gratings of the first combination, wherein the following equation and conditional expressions are satisfied for a wavelength w (nm) in a range of 370 (nm)<w<730 (nm):

$N1Aw-N1Bw=0;$ $16<(v1A-v1B)<75;$ $0.03<|N2Ad-N2Bd|<0.5;$ and $16<(v2A-v2B)<75,$ where N1Aw and N1Bw respectively denote refractive indices of the two diffraction gratings of the first combination at the wavelength w, v1A and v1B respectively denote Abbe numbers of the two diffraction gratings of the first combination, N2Ad and N2Bd respectively denote refractive indices of the two diffraction gratings of the second combination for a d-line, and v2A and v2B respectively denote Abbe numbers of the two diffraction gratings of the second combination.

11. An image pickup apparatus comprising:
an optical system; and
a solid-state image pickup element which receives light of an image formed by the optical system,
wherein the optical system has a diffractive optical element comprising:
a diffractive optical element comprising multiple diffraction gratings that are laminated,
wherein the multiple diffraction gratings include:
a first combination defined by a combination of two diffraction gratings, among the multiple diffraction gratings, with grating side surfaces thereof contacting each other or disposed close to each other in a grating pitch direction; and
a second combination defined by a combination of two diffraction gratings, among the multiple diffraction gratings,
wherein at least one of the two diffraction gratings of the second combination is made of a material that is different from the materials of the two diffraction gratings of the first combination,
wherein the following equation and conditional expressions are satisfied for a wavelength w (nm) in a range of 370 (nm)<w<730 (nm):

$N1Aw-N1Bw=0;$ $16<(v1A-v1B)<75;$ $0.03<|N2Ad-N2Bd|<0.5;$ and $16<(v2A-v2B)<75,$ where N1Aw and N1Bw respectively denote refractive indices of the two diffraction gratings of the first combination at the wavelength w, v1A and v1B respectively denote Abbe numbers of the two diffraction gratings of the first combination, N2Ad and N2Bd respectively denote refractive indices of the two diffraction gratings of the second combination for a d-line, and v2A and v2B respectively denote Abbe numbers of the two diffraction gratings of the second combination.

12. A diffractive optical element comprising:
a first diffraction grating having a refractive index N1Aw for a wavelength w (nm), a refractive index N1Ad for a d-line, and an Abbe number v1A for the d-line;
a second diffraction grating having a refractive index N1Bw for the wavelength w and an Abbe number v1B for the wavelength w; and
a third diffraction grating having a refractive index N2Bd for a d-line and an Abbe number v2B for the d-line,
wherein the first diffraction grating and the second diffraction grating are disposed so that diffraction side surfaces of the first and second diffraction gratings are disposed in intimate contact with each other in a grating pitch direction,
wherein the wavelength w satisfies the following equation in a range of 370 (nm)<w<730 (nm):

$N1Aw-N1Bw=0,$ and wherein the following conditional expressions are satisfied:

$16<(v1A-v1B)<75;$ $0.03<|N1Ad-N2Bd|<0.5;$ and $16<(v1A-v2B)<75.$

13. The diffractive optical element according to claim 12, wherein grating side surfaces of two of the first, and second, and third diffraction gratings are disposed in intimate contact to a grating side surface of the other of the two of the first, second, and third diffraction gratings.

14. The diffractive optical element according to claim 13, wherein a sum of heights of the grating side surfaces of the two of the first, second, and third diffraction gratings is equal to a sum of height of the grating side surface of the other of the two of the first, and second, and third diffraction gratings.

15. A diffractive optical element comprising:
a first diffraction grating having a refractive index N1Aw for a wavelength w (nm) and an Abbe number v1A for the wavelength w;
a second diffraction grating having a refractive index N1Bw for the wavelength w, a refractive index N1Bd for a d-line and an Abbe number v1B for the d-line; and
a third diffraction grating having a refractive index N2Ad for a d-line and an Abbe number v2A for the d-line,
wherein the first diffraction grating and the second diffraction grating are disposed so that diffraction side surfaces of the first and second diffraction gratings are disposed in intimate contact with each other in a grating pitch direction,
wherein the wavelength w satisfies the following equation in a range of 370 (nm)<w<730 (nm):

$N1Aw-N1Bw=0,$ and wherein the following conditional expressions are satisfied:

$16<(v1A-v1B)<75;$ $0.03<|N2Ad-N1Bd|<0.5;$ and $16<(v2A-v1B)<75.$

16. The diffractive optical element according to claim 15, wherein grating side surfaces of two of the first, and second, and third diffraction gratings are disposed in intimate contact to a grating side surface of the other of the two of the first, second, and third diffraction gratings.

17. The diffractive optical element according to claim 16, wherein a sum of heights of the grating side surfaces of the two of the first, second, and third diffraction gratings is equal to a sum of height of the grating side surface of the other of the two of the first, and second, and third diffraction gratings.

18. A diffractive optical element comprising:
a first diffraction grating having a refractive index $N1Aw$ for a wavelength w (nm) and an Abbe number $v1A$ for the wavelength w;
a second diffraction grating having a refractive index $N1Bw$ for the wavelength w and an Abbe number $v1B$ for the wavelength w;
a third diffraction grating having a refractive index $N2Ad$ for a d-line and an Abbe number $v2A$ for the d-line; and
a fourth diffraction grating having a refractive index $N2Bd$ for a d-line and an Abbe number $v2B$ for the d-line,
wherein the first diffraction grating and the second diffraction grating are disposed so that diffraction side surfaces of the first and second diffraction gratings are disposed in intimate contact with each other in a grating pitch direction,
wherein the wavelength w satisfies the following equation in a range of 370 (nm)<w<730 (nm):

$$N1Aw - N1Bw = 0, \text{ and}$$

wherein the following conditional expressions are satisfied:

$$16 < (v1A - v1B) < 75;$$

$$0.03 < |N2Ad - N2Bd| < 0.5; \text{ and}$$

$$16 < (v2A - v2B) < 75.$$

19. The diffractive optical element according to claim 18, wherein one of the third or fourth diffraction grating is one of the first or second diffraction grating.

* * * * *